(12) United States Patent
Maeda

(10) Patent No.: US 6,859,877 B2
(45) Date of Patent: Feb. 22, 2005

(54) IMAGE PROCESSING APPARATUS AND METHOD, AND COMPUTER READABLE MEMORY MEDIUM STORING PROGRAM FOR EXECUTING IMAGE PROCESSING

(75) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/875,857

(22) Filed: Jun. 8, 2001

(65) Prior Publication Data
US 2002/0010859 A1 Jan. 24, 2002

(30) Foreign Application Priority Data

Jun. 12, 2000 (JP) .......................................... 2000-175264
Jun. 12, 2000 (JP) .......................................... 2000-175337

(51) Int. Cl.[7] .............................. G06F 9/00; G06F 9/36
(52) U.S. Cl. ........................ 713/180; 380/201; 380/200
(58) Field of Search ................................. 713/180, 168; 380/200, 201

(56) References Cited

U.S. PATENT DOCUMENTS 5,648,855 A * 7/1997 Yanagihara ................... 386/80
5,768,431 A * 6/1998 Saunders et al. ............ 382/236
5,825,931 A * 10/1998 Owada et al. ............... 382/236
5,946,446 A * 8/1999 Yanagihara .................... 386/68
6,256,349 B1 * 7/2001 Suzuki et al. ........... 375/240.18
6,373,895 B2 * 4/2002 Saunders et al. ....... 375/240.19

* cited by examiner

Primary Examiner—Norman M. Wright
(74) Attorney, Agent, or Firm—Fitzpatrick, Cella, Harper & Scinto

(57) ABSTRACT

The invention provides an image processing apparatus comprising an input unit for inputting image data, a generation unit for generating security data for protecting the image data, a division unit for dividing the image data into blocks, an encoding unit for encoding the image data in the unit of the block, adaptively utilizing an intrapicture encoding mode and an interpicture encoding mode, a selection unit for selecting the encoding mode, and an output unit for outputting security data generated by the generation unit, image data encoded by the encoding unit, and encoding mode data indicating the encoding mode selected by said selection unit, wherein the selection unit selects the encoding mode in such a manner that the image data of an arbitrary block in a picture are subjected to intrapicture encoding at least once within n pictures according to the security data.

19 Claims, 30 Drawing Sheets

FIG. 3

| Code Length | IP code | Security Start Time | Security End Time | Code Length | IP code | Security Start Time | Security End Time | ...... |
|---|---|---|---|---|---|---|---|---|
| 2001 | 2002 | 2003 | 2004 | | | | | |

FIG. 8A FIG. 8B FIG. 8C FIG. 8D FIG. 8E FIG. 8F FIG. 8G FIG. 8H FIG. 8I

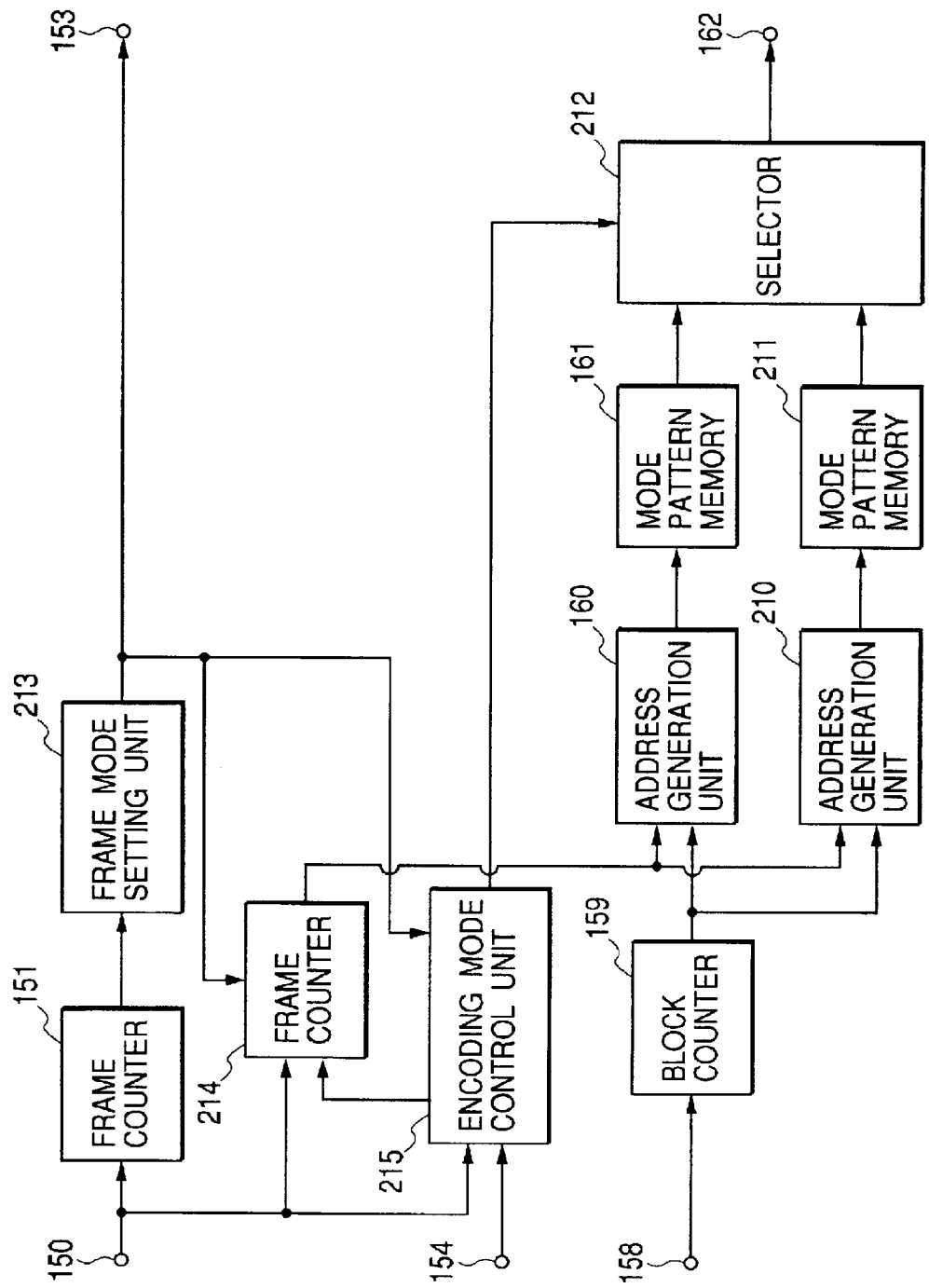

IMAGE PROCESSING APPARATUS AND METHOD, AND COMPUTER READABLE MEMORY MEDIUM STORING PROGRAM FOR EXECUTING IMAGE PROCESSING

BACKGROUND OF THE INVENTION

1. Field of the Invention

The present invention relates to an image processing apparatus, an image processing method and a computer readable memory medium, and more particularly to an image data encoding or decoding process for image protection (protection of intellectual property right (for example copyright)).

2. Related Background Art

For encoding a moving image, there have been known an intraframe encoding method such as Motion JPEG (Joint Photographic Coding Experts Group) and an encoding method of digital video, and a method based on interframe prediction encoding such as H.261, H.263, MPEG (Moving Picture Coding Experts Group)-1 or MPEG-2. These encoding methods are recognized as international standards by ISO (International Organization for Standardization) or ITU (International Telecommunication Union). The former one, executing encoding independently for each frame and enabling easy frame management, is best suited for editing the moving image or for an apparatus requiring special reproduction. On the other hand, the latter one, relying on the interframe prediction, are featured by a high encoding efficiency.

Also MPEG-4 is now in the course of international standardization as a general-purpose next-generation multimedia encoding standard usable in various areas such as computer, broadcasting, communication etc.

With the spreading of the aforementioned digital encoding standards, the issue of copyright protection is strongly requested from the contents industries. Stated differently, the issue is that the good contents cannot be safely provided in a standard which cannot guarantee the sufficient protection of the copyright.

Therefore, in order to protect the copyright of a part of the moving image, there is conceived a method of temporarily suspending the decoding of the moving image so as not to reproduce a part thereof. In consideration of the image right or copyright of the moving image, the method suspends the decoding of a portion relating to such rights and re-starts the decoding when such portion is over.

There is however encountered the following drawback.

For encoding a moving image, there is generally employed an encoding method utilizing interframe correlation, as represented by H.261, H.263, MPEG-1, MPEG-2 or MPEG-4 mentioned in the foregoing, In these encoding methods, the encoding is basically executed by referring to a frame preceding in time or preceding and following frames, and accordingly executing movement compensation.

FIG. 1 shows the mode of reproduction in H.261, H.263 etc., wherein $I_x$ indicates a frame for executing intraframe encoding and $P_x$ indicates a frame for executing interframe encoding. In FIG. 1, time indicates the direction of lapse of time. In security, a black zone indicates the period in which the decoding is interrupted for image protection (protection of intellectual property right (for example copyright)), while code indicates the arrangement of images in the order of encoding process, and display indicates the arrangement of images in the order of display.

It is now assumed that the decoding is interrupted in a period from $P_4$ to $P_7$ for the purpose of security (image protection (protection of intellectual property right (for example copyright))). The decoding of the moving image is stopped at $P_3$ and the image is no longer displayed until the decoding is re-started. Since the writing of the encoded data into the buffer is also stopped simultaneous with the interruption of decoding, the encoded data from $P_4$ to $P_7$ are discarded. Therefore, when the decoding is re-started from $P_8$, the decoding thereafter cannot be executed in normal manner since the data of $P_7$ to be referred to in the decoding of $P_8$ are already discarded, so that there may be encountered a distortion of the image or an interruption of decoding in the frames $P_8$ to $P_{14}$ until the frame $I_1$ of intraframe encoding is decoded.

SUMMARY OF THE INVENTION

In consideration of the foregoing, an object of the present invention is to provide an image processing apparatus, an image processing method and a computer readable memory medium storing an image processing program, capable of advantageously controlling image reproduction/stopping for image protection (protection of intellectual property right (for example copyright)).

The above-mentioned object can be attained, according to a scope of the present invention, by an image processing apparatus comprising input means for inputting image data, generation means for generating security data for protecting the image data, division means for dividing the image data into blocks, encoding means for encoding the image data on each block basis adaptively utilizing an intrapicture encoding mode and an interpicture encoding mode, selection means for selecting the encoding mode, and output means for outputting security data generated by the generation means, image data encoded by the encoding means and encoding mode data indicating the encoding mode selected by the selection means, wherein the selection means selects the encoding mode according to the security data in such a manner that the image data in an arbitrary block within a picture are intrapicture encoded at least once for n pictures.

Also according to another aspect of the present invention, there is provided an image processing method comprising an input step of inputting image data, a generation step of generating security data for protecting the image data, a division step of dividing the image data into blocks, an encoding step of encoding the image data on each block basis adaptively utilizing an intrapicture encoding mode and an interpicture encoding mode, a selection step of selecting the encoding mode, and an output step of outputting security data generated in the generation step, image data encoded in the encoding step and encoding mode data indicating the encoding mode selected in the selection step, wherein the selection step includes a step of selecting the encoding mode according to the security data in such a manner that the image data in an arbitrary block within a picture are intrapicture encoded at least once for n pictures.

Also according to another scope of the present invention, there is provided a computer readable memory medium storing a code of an input step of inputting image data, a step of a generation step of generating security data for protecting the image data, a code of a division step of dividing the image data into blocks, a code of an encoding step of encoding the image data on each block basis adaptively utilizing an intrapicture encoding mode and an interpicture encoding mode, a code of a selection step of selecting the encoding mode, and a code of an output step of outputting security data generated in the generation step, image data encoded in the encoding step and encoding mode data indicating the encoding mode selected in the selection step, wherein the selection step includes a step of selecting the encoding mode according to the security data in such a manner that the image data in an arbitrary block within an image are intrapicture encoded at least once for n images.

Also according to another scope of the present invention, there is provided an image processing apparatus comprising input means for inputting image data encoded by dividing an image into plural blocks and adaptively selecting an intrapicture encoding mode and an interpicture encoding mode on a block basis and security data for protecting the image data, discrimination means for discriminating whether the reproduction of the encoded image data is permitted according to the security data, encoding mode judging means for judging the encoding mode of the encoded image data on a block basis, decoding means for decoding the image data input by the input means, memory means for storing the image data decoded by the decoding means, and control means for reading the image data stored in the memory means according to the outputs of the discrimination means and the encoding mode judging means.

Also according to another aspect of the present invention, there is provided an image processing method comprising an input step of inputting image data encoded by dividing an image into plural blocks and adaptively selecting an intrapicture encoding mode and an interpicture encoding mode on a block basis and security data for protecting the image data, a discrimination step of discriminating whether the reproduction of the encoded image data is permitted according to the security data, an encoding mode judging step of judging the encoding mode of the encoded image data on a block basis, a decoding step of decoding the input image data, a memory step of storing the decoded image data in memory means, and a control step of controlling the readout of the image data stored in the memory means according to the results of the discrimination step and the encoding mode judging step.

Also according to another scope of the present invention, there is provided a computer readable memory medium storing a code of an input step of inputting image data encoded by dividing an image into plural blocks and adaptively selecting an intrapicture encoding mode and an interpicture encoding mode on a block basis and security data for protecting the image data, a code of a discrimination step of discriminating whether the reproduction of the encoded image data is permitted according to the security data, a code of an encoding mode judging step of judging the encoding mode of the encoded image data, a code of a decoding step of decoding the input image data, a code of a memory step of storing the decoded image data in memory means, and a code of a control step of controlling the readout of the image data stored in the memory means according to the results of the discrimination step and the encoding mode judging step.

Other objects, features and advantages of the invention will become apparent from the following detailed description taken in conjunction with the accompanying drawings.

BRIEF DESCRIPTION OF THE DRAWINGS

FIG. 3 is a view showing an example of encoded data of security information;

FIGS. 8A, 8B, 8C, 8D, 8E, 8F, 8G, 8H and 8I are views showing another example of arrangement of macroblocks which always execute intraframe encoding in the first embodiment of the present invention;

FIG. 10 is a block diagram showing the configuration of an encoding mode control unit 203 shown in FIG. 9 in the second embodiment of the present invention;

DETAILED DESCRIPTION OF THE PREFERRED EMBODIMENTS

In the following there will be explained a first embodiment of the present invention in detail with reference to the accompanying drawings.

Figure 1:
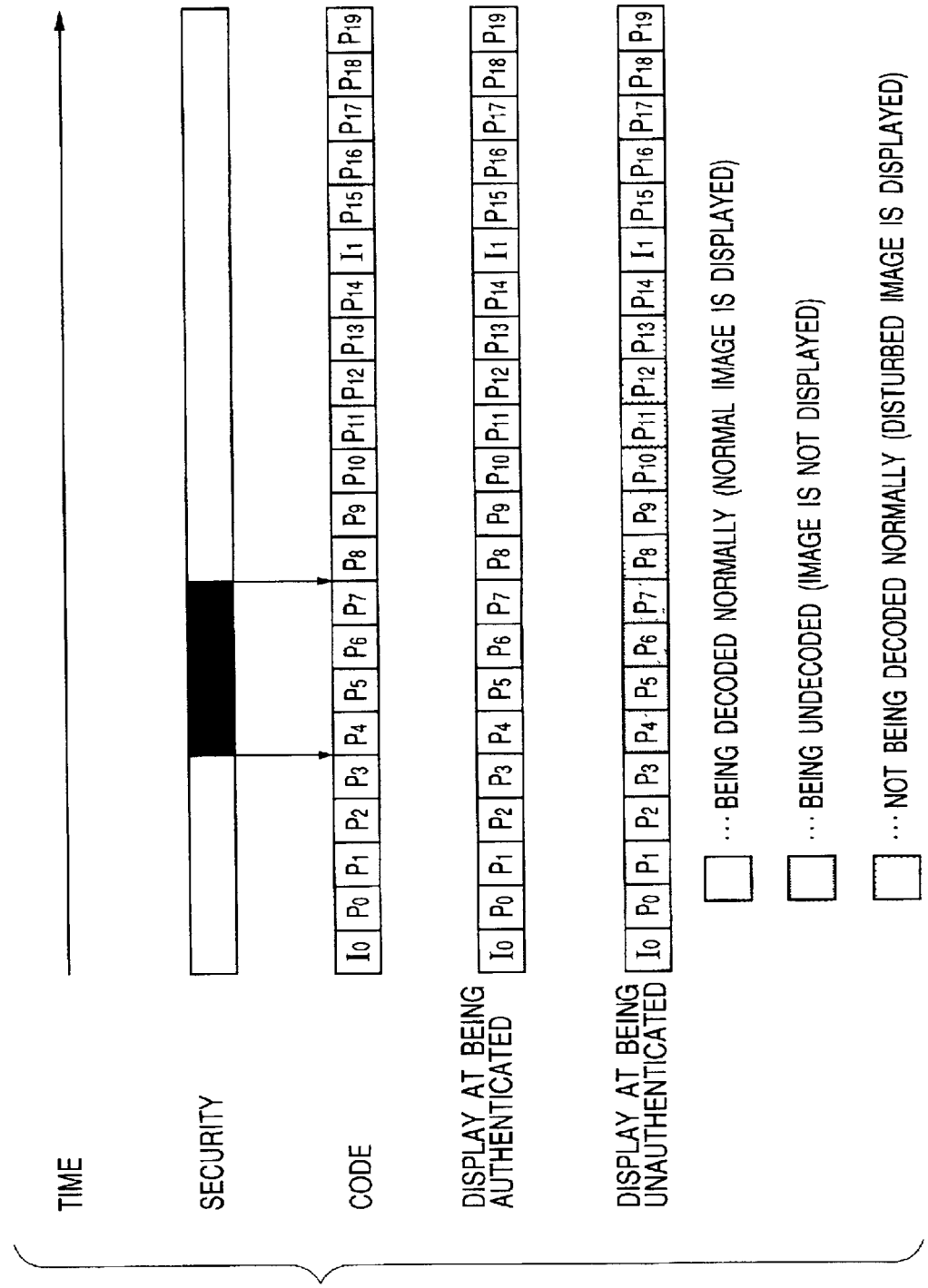
FIG. 1 is a view showing a conventional decoding process.
Figure 2:
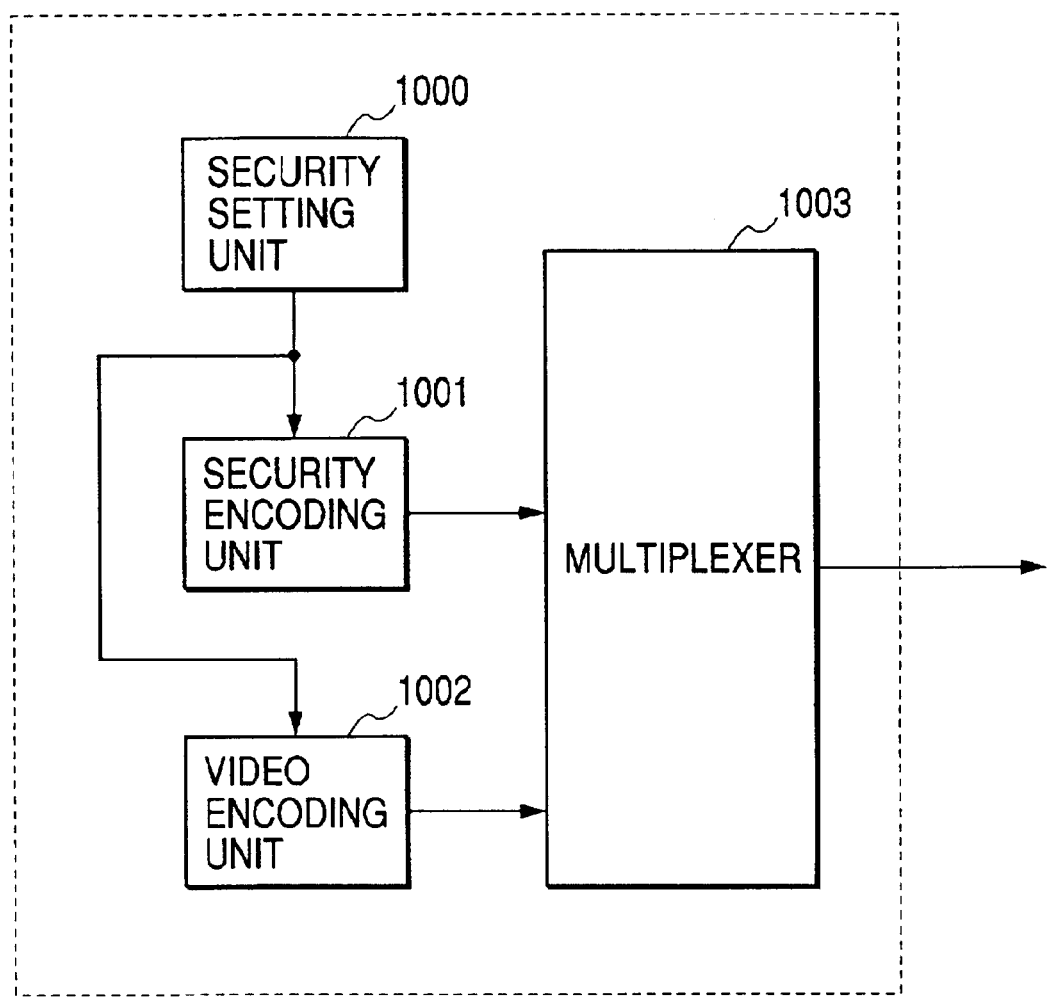
FIG. 2 is a block diagram showing the configuration of an image processing apparatus constituting first and second embodiments of the present invention.

FIG. 2 is a block diagram showing the configuration of an image processing apparatus of a first embodiment of the present invention.

Referring to FIG. 2, there are provided a security setting unit 1000 for generating security information for permitting or inhibitng reproduction of all the moving image or in a part thereof, and a security encoding unit 1001 for encoding the generated security information.

A video encoding unit 1002 serves to encode the moving image data. In the present embodiment, there will be explained a case of employing H.263 encoding method for encoding the moving image.

For the purpose of simplicty, the size of the image to be encoded is assumed to be QCIF (176×144 pixels), but the present invention is not limited to such image size. Also for the purpose of simplicity, the encoding is assumed to be executed in the unit of a frame and to have an I-frame mode for executing the intraframe encoding and a P-frame mode utilizing interframe correlation. A multiplexing unit 1003 multiplexes the security encoded data and the moving image encoded data thereby generating moving image data.

In the following there will be explained the encoding process for the moving image data in the image processing apparatus of the above-described configuration.

An operator (not shown) inputs the image data into the video encoding unit 1002 and also inputs security information indicating a time for starting security (image protection (protection of intellectual property (for example copyright))), a time for ending the security and a cancel key for cancelling the security into the security setting unit 1000. The security setting unit 1000 rearranges the entered security information in the order of starting time of the security and holds such information.

The security encoding unit 1001 encodes the security information set by the security setting unit 1000 and outputs such information to the multiplexing unit 1003.

In the following there will be given a detailed explanation on the encoded data of the security information (hereinafter called security encoded data).

FIG. 3 shows the configuration of the security encoded data.

Referring to FIG. 3, there are shown a Code Length code 2001 indicating the code length, an IP code 2002 representing information required for discriminating (authenticating) the permission for the reproduction of data to which security is applied, a Security Start Time code 2003 indicating the time for starting the security, and a Security End Time code 2004 indicating the time for ending the security. The codes 2002 to 2004 are present in continuation in plural sets in case of that the moving image portion to which the security is to be applied is present in plural units in distributing manner.

In the present embodiment, the security encoded data are multiplexed by the multiplexing unit 1003 at the head of the image data. However, such method is not restrictive, and the security encoded data may be transmitted by time-shared multiplexing in the moving image data.

Referring again to FIG. 2, the security setting unit 1000 inputs a frame from which the security is started, and a frame at which the security is ended, in succession into the video encoding unit 1002.

In the following there will be given a detailed explanation on the video encoding unit 1002.

Figure 4:
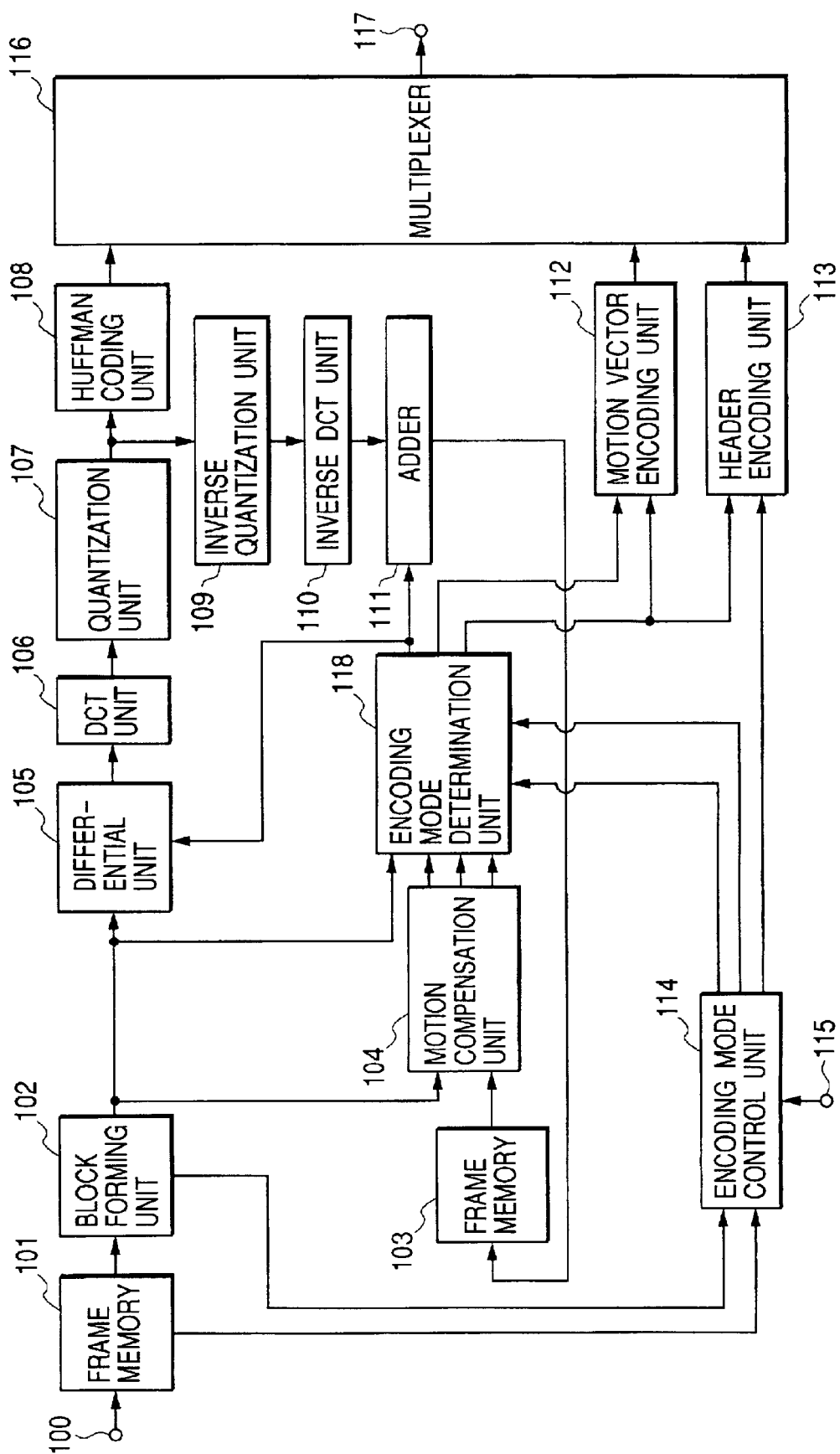
FIG. 4 is a block diagram showing the configuration of a video encoding unit 1002 shown in FIG. 2 in the first embodiment of the present invention.

FIG. 4 is a block diagram showing the configuration of the video encoding unit 1002.

In FIG. 4, there are shown a terminal 100 for inputting the moving image data to be encoded, a frame memory 101 for storing the input moving image data in the unit of a frame, and a block division unit 102 for reading the data in the unit of a block which is an encoding unit, from the frame memory 101. As the present embodiment is explained taking the H.263 encoding method as an example, the block corresponds to a macroblock.

The macroblock contains one section of luminance component and spatially corresponding color difference components. For example, in case of a format with a sampling ratio 4:2:0 for the luminance component and the color difference components, the macroblock is composed of four luminance component blocks and two color difference component blocks.

There are also provided a frame memory 103 for storing the decoded image in the unit of a frame, and a motion compensation unit 104 for executing motion compensation based on the content of the frame memory 103 and the output of the block division unit 102, temporarily determining the encoding mode for each macroblock and outputting the data of such predicted image. The encoding mode of the macroblock includes an I-macroblock mode for encoding the input pixel values without motion compensation, and a P-macroblock mode for executing the motion compensation. In case the motion compensation is executed (P-macroblock mode), there is also outputted the motion vector.

A differentiation unit 105 calculates the difference between the output of the block division unit 102 and an output of an encoding mode determination unit 118 for each pixel, thereby determining the prediction error. There are also provided a DCT unit 106 for executing DCT (discrete cosine transformation) on the determined prediction error or the pixel value, a quantization unit 107 for quantizing the output of the DCT unit 106, and a Huffman encoding unit 108 for assigning a Huffman code to the output of the quantization unit 107.

There are further provided an inverse quantization unit 109 for inverse quantization of the output of the quantization unit 107, an inverse DCT unit 110 for inverse DCT on the output of the inverse quantization unit 109, and an addition unit 111 for adding, in the unit of each pixel, the predicted image data from the encoding mode determination unit 118 and the output of the inverse DCT unit 110.

There are further provided a motion vector encoding unit 112 for encoding the motion vector, and a header encoding unit 113 for generating and encoding a header in the unit of a frame or a header in the unit of a macroblock. The header contains, according to the H.263 encoding method, the encoding data such as a frame start code, a frame encoding mode, a macroblock encoding mode, etc.

An encoding mode control unit 114 determines the encoding mode of the frame, the encoding mode of the macroblock, etc. A terminal 115 is used for inputting in succession information such as a security (image protection (projection of intellectual property (for example copyright))) starting frame, a security ending frame, etc. from the security setting unit 1000 shown in FIG. 2.

A multiplexing unit 116 multiplexes the outputs of the Huffman encoding unit 108, the motion vector encoding unit 112 and the header encoding unit 113 according to the code format of the H.263 encoding method. A terminal 117 is used for outputting the multiplexed encoded data.

An encoding mode determination unit 118 determines the encoding mode in the unit of a macroblock based on the outputs of the encoding mode control unit 114 and the motion compensation unit 104 and outputs a prediction value and a motion vector corresponding to the determined encoding mode.

In such configuration, various units are initialized prior to the operation of the apparatus. On the input moving image data, the encoding mode setting unit 114 encodes the head frame by the I-frame mode, and thereafter adopts the I-frame mode for every 132nd frame. For other frames, the encoding mode is set so that those frames are encoded in the P-frame mode utilizing an immediately preceding frame as the reference frame. Also there is generated a signal for instructing the method for determining the encoding mode of each macroblock.

Figure 5:
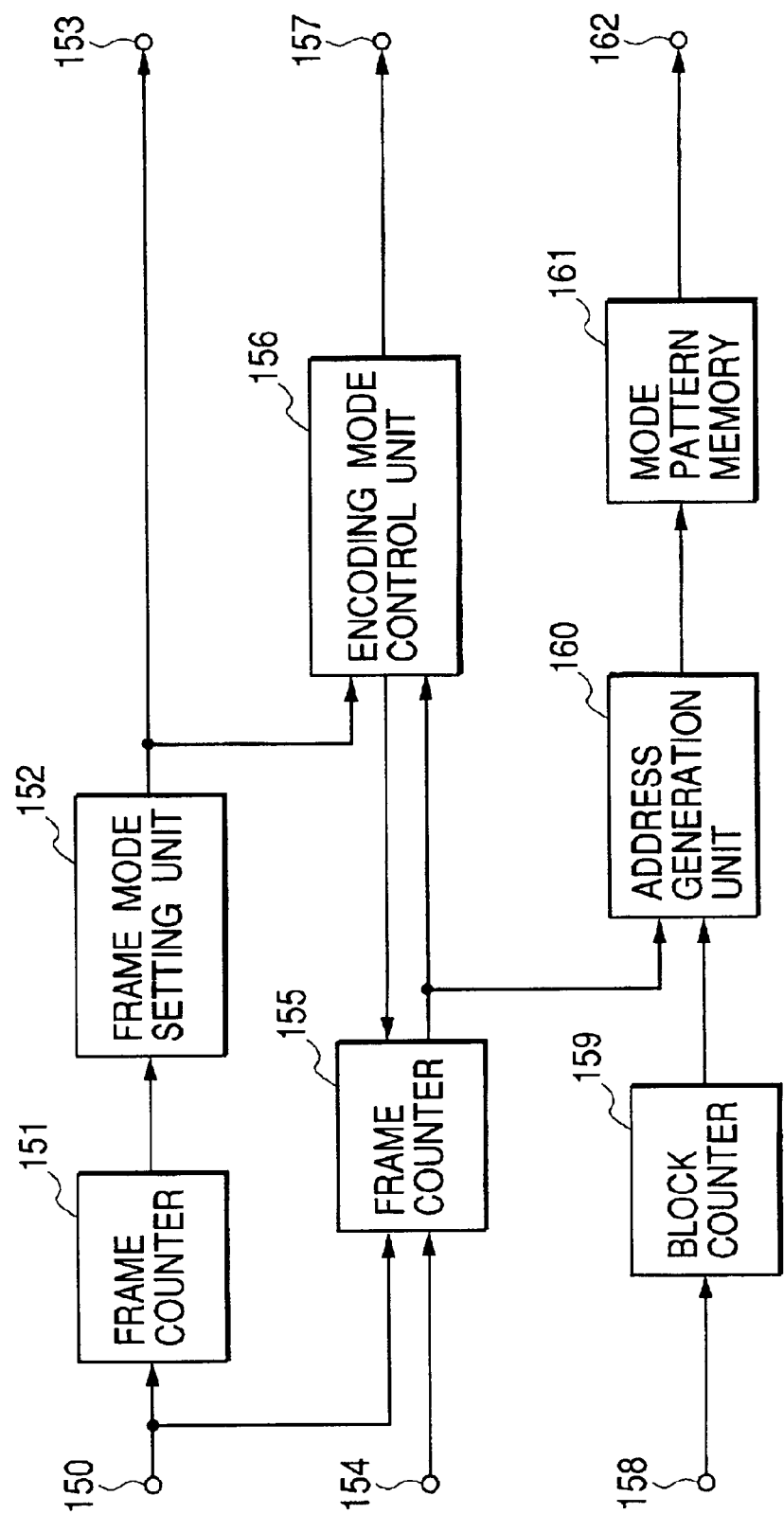
FIG. 5 is a block diagram showing the configuration of an encoding mode control unit 114 shown in FIG. 4 in the first embodiment of the present invention.

FIG. 5 is a detailed block diagram of the encoding mode control unit 114.

In FIG. 5, there are shown a terminal 150 for inputting a signal for informing the storage of data from the frame memory 101 in the unit of a frame, and a frame counter 151 for counting the number of the processed frames. The frame counter 151 is set to a value 0 at the initialization at the start of the encoding process.

A frame mode setting unit 152 sets the I-frame mode for the initial frame and for every 132nd frame thereafter, and the P-frame mode for other frames.

A terminal 153 is used for outputting the frame mode, outputted by the frame mode setting unit 152, to the header encoding unit 113, and a terminal 154 is used for inputting security information indicating the start and end of the security from the security setting unit 1000.

There are also provided a frame counter 155 to be reset according to the security information input from the terminal 154 and to execute a downcount for every frame input, an encoding mode control unit 156 for generating a signal for controlling the encoding mode control unit 118 based on the outputs of the frame mode setting unit 152 and the frame counter 155, and a terminal 157 for outputting the output of the encoding mode control unit 156 to the encoding mode determination unit 118.

A terminal 158 is used for inputting a signal informing the output of block division from the block dividing unit 102, and a block counter 159 for counting the number of blocks from the head of the frame. The block counter 159 is reset to 0 at the start of a frame.

An address generation unit 160 calculates the address on the memory of a mode pattern memory 161, and a mode pattern 161 stores information relating to the encoding mode of the macroblock in a frame, as will be explained later in more details.

A terminal 162 is used for outputting the output of the mode pattern memory 161 to the encoding mode determination unit 118.

In the above-described configuration, the signal input from the terminal 150 is input and counted in the frame counter 151. The counted value is input into the frame memory setting unit 152, and, in case the remainder in the division of the counted value by 132 is 1, there is adopted the I-frame mode which is output as the frame encoding mode from the terminal 153. In other cases, there is adoopted the P-frame mode which is output as the frame encoding mode from the terminal 153.

On the other hand, there is input, from the terminal 154, information indicating whether the frame to be encoded is a frame for starting the inhibition of decoding for the purpose of security or a frame cancelling the inhibition of decoding.

At first there will be explained a case where the input from the terminal 154 is not a frame starting the inhibition of decoding nor a frame cancelling the inhibition of decoding. Such case will hereinafter be called a normal state.

At first the frame counter 155 is set to 0.

Following operations will be executed in case the frame mode setting unit 152 outputs the I-frame mode. The frame mode setting unit 152 outputs the I-frame mode through the terminal 153.

The output of the frame mode setting unit 152 is input into the encoding mode control unit 156, which, since the content of the frame counter is 0, outputs 0 so as that the encoding mode determination unit 118 executes operation in the I-frame mode in the normal state. Such output will be called an encoding mode control signal.

Following operations will be executed in case the frame mode setting unit 152 sets the P-frame mode. The output of the frame mode setting unit 152 is input into the encoding mode control unit 156, which, since the content of the frame counter is 0, outputs 0 as the encoding mode control signal so as that the encoding mode determination unit 118 executes process of the normal state by selecing the encoding mode of the macroblock output by the motion compensation unit 104.

Then there will be explained a case where the input from the terminal 154 is a frame starting the inhibition of decoding or a frame cancelling the inhibition of decoding. In such case the frame coounter 155 is set to 8.

Following operations will be executed in case the frame mode setting unit 152 sets the I-frame mode. The frame mode setting unit 152 outputs the I-frame mode through the terminal 153.

The output of the frame mode setting unit 152 is input into the encoding mode control unit 156, which sets 0 in the frame counter 155 and outputs 0 as the encoding mode control signal from the terminal 157 as in the I-frame mode in the normal state.

Following operations will be executed in case the frame mode setting unit 152 outputs the P-frame mode. The output of the frame mode setting unit 152 is input into the encoding mode control unit 156, which, in case of the normal state where the content of the frame counter 155 is 0, outputs 0 as the encoding mode control signal as in the P-frame mode in the normal state.

Following operations will be executed in case the content of the frame counter is not 0.

The encoding mode control unit 156, being not in the normal state but in the P-frame mode, outputs 1 as the encoding mode control signal from the terminal 157. Such non-normal state will be called an abnormal state.

The block counter 159 is set to 0 prior to the processing of a frame. The block counter 159 executes counting for every input of the signal informing the output of block division from the terminal 158. The counted value of the blocks is input into the address generation unit 160, which also receives the counted value of the frames from the frame counter 155. The address generation unit 160 generates an address for reading the value of the mode pattern memory 161.

The mode pattern memory 161 stores patterns as shown in FIGS. 6A to 6I, which show a QCIF image as an example, wherein each square represents a macroblock. In these figures, each black square indicates the position of a macroblock for which the intraframe encoding (I-macroblock mode) is instructed regardless of the discrimination by the motion compensation unit 104.

Figure 6E:
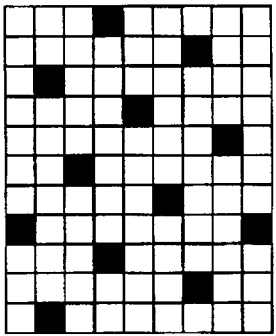
FIGS. 6A, 6B, 6C, 6D, 6E, 6F, 6G, 6H and 6I are views showing an example of arrangement of macroblocks which always execute intraframe encoding in the first embodiment of the present invention.
Figure 6I:
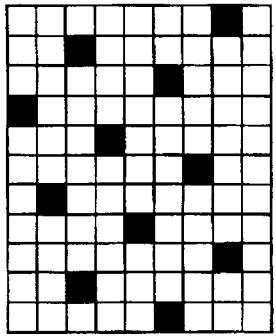
Figure 6D:
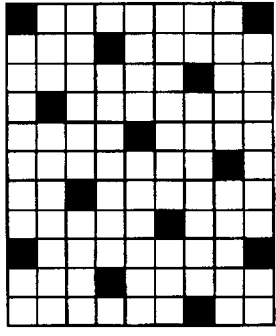
Figure 6H:
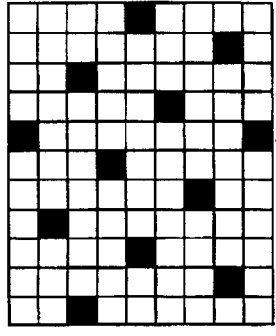
Figure 6C:
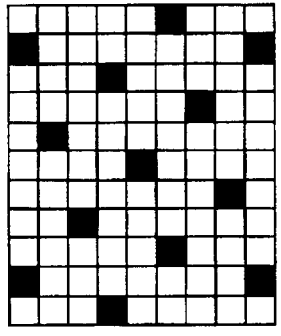
Figure 6G:
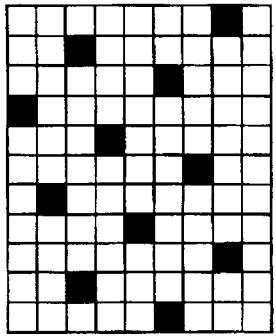
Figure 6A:
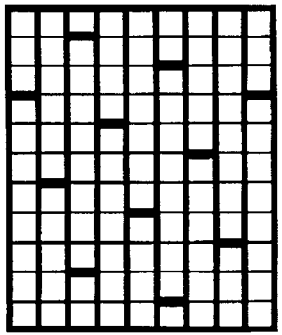
Figure 6B:
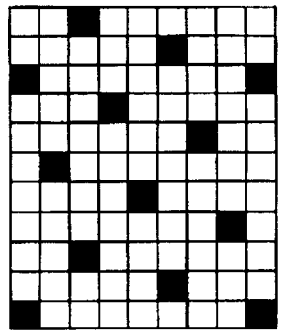
Figure 6F:
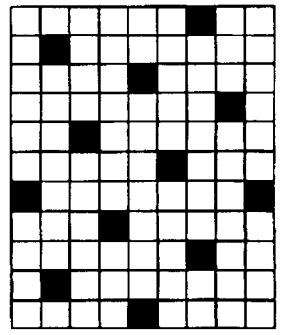

If the value of the frame counter is divisible by 8, there is selected the pattern shown in FIG. 6B, but, if the remainder of the division is 7, 6, 5, 4, 3, 2 or 1, there is respectively selected the pattern of FIG. 6C, 6D, 6E, 6F, 6G, 6H or 6I. Thus, within the thicker frame shown in FIG. 6A, an I-macroblock mode is set for every 8 macroblocks within all the macroblocks. Then the encoding mode is output, according to the block count, with the macroblock mode discriminated by the motion compensation unit 104 if the corresponding macroblock is white and with the I-macroblock mode if the corresponding macroblock is black. The white and black in FIGS. 6B to 6I are respectively output by 0 and 1, and such output is called a macroblock mode selection signal.

The encoding mode of the macroblock designated by the address generation unit 160 is read from the mode pattern memory 161 and is output as the macroblock mode selection signal to the encoding mode determination unit 118 through the terminal 162.

Now reference is made again to FIG. 4 for explaining the operation. The moving image data are input in succession from the terminal 100 and stored in the frame memory 101. After the accumulation of a frame, the frame memory 101 informs the encoding mode control unit 114 of such storage.

The encoding mode control unit 114 determines whether the frame mode setting unit 152, shown in FIG. 5, encodes the input frame by the I-frame mode or by the P-frame mode. The determined encoding mode for the frame is input into the header encoding unit 113, which encodes the start code of the frame, the frame encoding mode indicating the intraframe encoding etc. for output to the multiplexing unit 116.

The block division unit 102 cuts out data in the unit of a macroblock from the frame memory 101 and inputs such data into the motion compensation unit 104 and the differentiation unit 105.

The motion compensation unit 104 executes motion compensation based on the input data of the macroblocks and the image data stored in the frame memory 103 to calculate the prediction value, thereby calculating the prediction error from the input macroblock data. Then calculated is the sum of the absolute values respectively of the calculated prediction error and the input macroblock data. If the sum of the absolute value of the input macroblock data is smaller than the calculated prediction error, the I-macroblock mode is temporarily determined as the encoding mode for the macroblock. In this state, the motion compensation unit 104 outputs 0 as a prediction value, and does not output the motion vector. On the other hand, if the former is larger, the P-macroblock mode is temporarily determined. In this case, the motion compensation unit 104 outputs the prediction value and the motion vector to the encoding mode determination unit 118.

In the following there will be given a detailed explanation on the encoding mode determination unit 118 with reference to FIG. 7 which is a detailed block diagram thereof.

Figure 7:
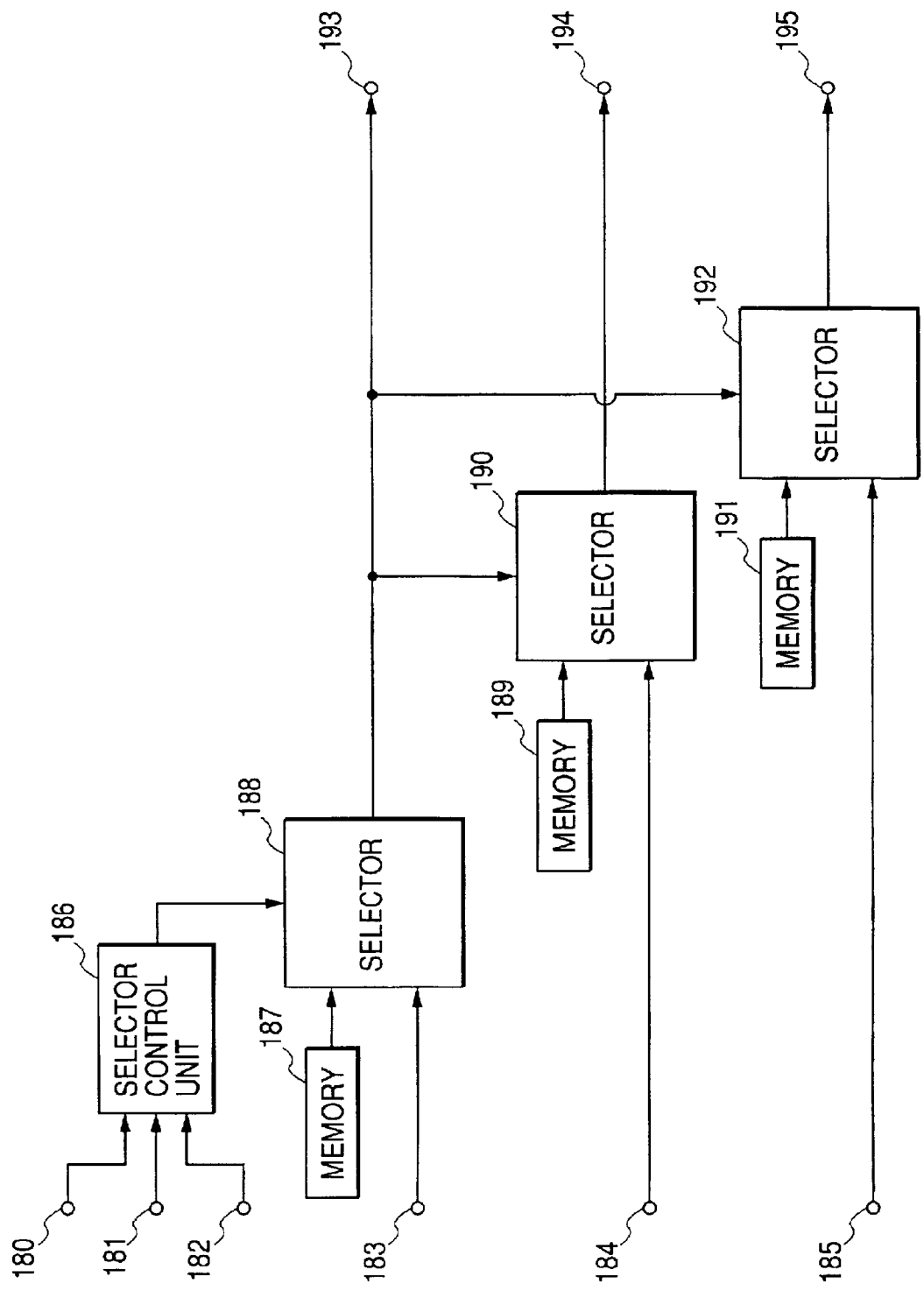
FIG. 7 is a block diagram showing the configuration of an encoding mode determination unit 118 shown in FIG. 4.

In FIG. 7, there are shown a terminal 180 for inputting the frame encoding mode from the encoding mode control unit 156, a terminal 181 for inputting the encoding mode control signal output from the encoding mode control unit 156 shown in FIG. 5, a terminal 182 for inputting the macroblock mode selection signal output from the mode pattern memory 161 shown in FIG. 5, a terminal 183 for temporarily determined macroblock encoding mode from the motion compensation unit 104, a terminal 184 for inputting the prediction value by the motion compensation from the motion compensation unit 104, and a terminal 185 for inputting the motion vector from the motion compensation unit 104.

There are also provided a selector control unit 186 for generating a signal for controlling the input for a selector 188 according to the inputs from the terminals 180, 181 and 182, memories 187, 189, 191 for storing data relating to the I-macroblock mode, and a selector 188 for outputting the input selected from the memory 187 and the terminal 183.

There are further provided selectors 190, 192 for selecting the input according to the output from the selector 188, and terminals 193, 194, 195 for respectively outputting, to the external, the outputs of the selectors 188, 190, 192.

In such configuration, the frame encoding mode input from the terminal 180, the encoding mode control signal input from the terminal 181 and the macroblock mode selection signal input from the terminal 182 are input into the selector control unit 186 to generate a control signal for controlling the selector 188 according to the following conditions.

In case the encoding mode control signal is 0, the macroblock mode selection signal is disregarded. In this state, if the frame encoding mode is I-frame mode, the control signal is so generated that the memory 187 is selected for the input of the selector 188.

In case the encoding mode control signal is 0 and indicates the P-frame mode, the control signal is so generated that the input from the terminal 183 is selected for the input to the selector 188, regardless of the macroblock mode selection signal input from the terminal 182.

Also in case the encoding mode control signal is 1, there is generated a control signal for switching the input of the selector 188 by the macroblock mode selection signal. More specifically, the control signal is so generated as to select the input from the terminal 183 or the output of the memory 187 for the input to the selector 188 respectively if the macroblock mode selection signal is 0 or 1.

According to the control described above, the selector 188 outputs the encoding mode of each macroblock. The encoding mode of the macroblock is output from the terminal 193 and input into the motion vector encoding unit 112 and the header encoding unit 113. The header encoding unit 113 executes encoding by adding the encoding mode to the header of each macroblock for output to the multiplexing unit 116.

On the other hand, the encoding mode of the macroblock is also supplied to the selectors 190, 192. The selector 190 outputs the prediction value from the terminal 194 for supply to the differentiation unit 105 and the addition unit 111 by selecting the content of the memory 189 or the input to the terminal 184 respectively if the input macroblock encoding mode is the I-macroblock mode or the P-macroblock mode. Thus, there is output a prediction value 0 in case of the I-macroblock mode or a prediction value generated by the motion compensation unit 104 in case of the P-macroblock mode.

The selector 192 selects the content of the memory 191 or the input of the terminal 185, respectively if the input macroblock encoding mode is the I-macroblock mode or the P-macroblock mode, for input through the terminal 195 into the motion vector encoding unit 112. Thus there is output a motion vector 0 in case of the I-macroblock mode or a motion vector generated by the motion compensation unit 104 in case of the P-macroblock mode. In case of the P-macroblock mode, the motion vector encoding unit 112 encodes the input motion vector for output to the multiplexing unit 116.

On the other hand, the differentiation unit 105 receives the prediction data of the macroblock from the encoding mode determination unit 118 and determines the difference between the received prediction data and the data of the macroblock divided and output from the block division unit 102. The difference is subjected to DCT in the DCT unit 106 and the DCT coefficient is quantized by the quantization unit 107 and input into the Huffman encoding unit 108 and the inverse quantization unit 109. The Huffman encoding unit 108 assigns a Huffman code determined by the H.263 encoding method to the result of quantization, for supply to the multiplexing unit 116.

The result of quantization input into the inverse quantization unit 109 is subjected to inverse quantization therein to provide the DCT coefficient which is then converted into the pixel value by the inverse DCT unit 110. The pixel value is added in the addition unit 111 with the prediction value output from the encoding mode determination unit 118, and is stored in a predetermined position in the frame memory 103.

The multiplexing unit 116 multiplexes the encoded data generated in the Huffman encoding unit 108, the motion vector encoding unit 112 and the header encoding unit 113 in the order determined in the H.263 encoding method and outputs the result from the terminal 117.

Referring again to FIG. 2, the security encoded data generated in the security encoding unit 1001 and the encoded data of the H.263 encoding method generated in the video encoding unit 1002 are multiplexed in the multiplexing unit 1003 and output to the exterior.

The selecting operations explained in the foregoing allows to easily determine the encoding mode of each block in such a manner that each macroblock executes the intraframe encoding within a predetermined time after the inhibition of decoding by security (image protection (protection of intellectual property (for example copyright))) or after the cancelling of the inhibition. In this manner the normal display can be restored within a short time after the inhibition of decoding by security is canceled, without inserting the frame of I-frame mode with a large code amount. Also the obtained encoded data completely match the standard method and do not require a special configuration in the decoding.

The foregoing embodiment has been explained with the H.263 method for encoding the moving image, but it can also be applied to other encoding methods such as H.261, MPEG-1 and MPEG-2.

The foregoing embodiment can also be applied to the MPEG-4 encoding method in which the security (image protection (protection of intellectual property (such as copyright))) is set in the unit of an object. In more general terms, the foregoing embodiment is applicable to any encoding method in which at least intraframe encoding and interframe encoding can be selected in the unit of a small area.

Also a unit may be composed of GOB (group of blocks) or even plural GOB's. Furthermore, the size or shape of the image is not limited to that in the foregoing embodiment.

Also the repeating cycle of the I-frame mode or P-frame mode is not limited to that in the foregoing embodiment, and need not be constant.

Also in the foregoing embodiment the DCT has been employed as the orthogonal transformation, but such example is not restrictive and there may naturally be employed for example the wavelet transformation.

Also the control of the block encoding mode is executed both at the inhibition of decoding by security and at the cancelling of inhibition, but such control may also be at either.

Also the encoding of the security information is not limited, and the security may naturally be controlled by the IPMP (intellectual property management and protection) described by the MPEG-4 system (ISO 14496-1), or the security information may be included on time-shared basis or in the moving image data.

Figures 8A, 8B, 8C, 8D, 8E, 8F, 8G, 8H, 8I:
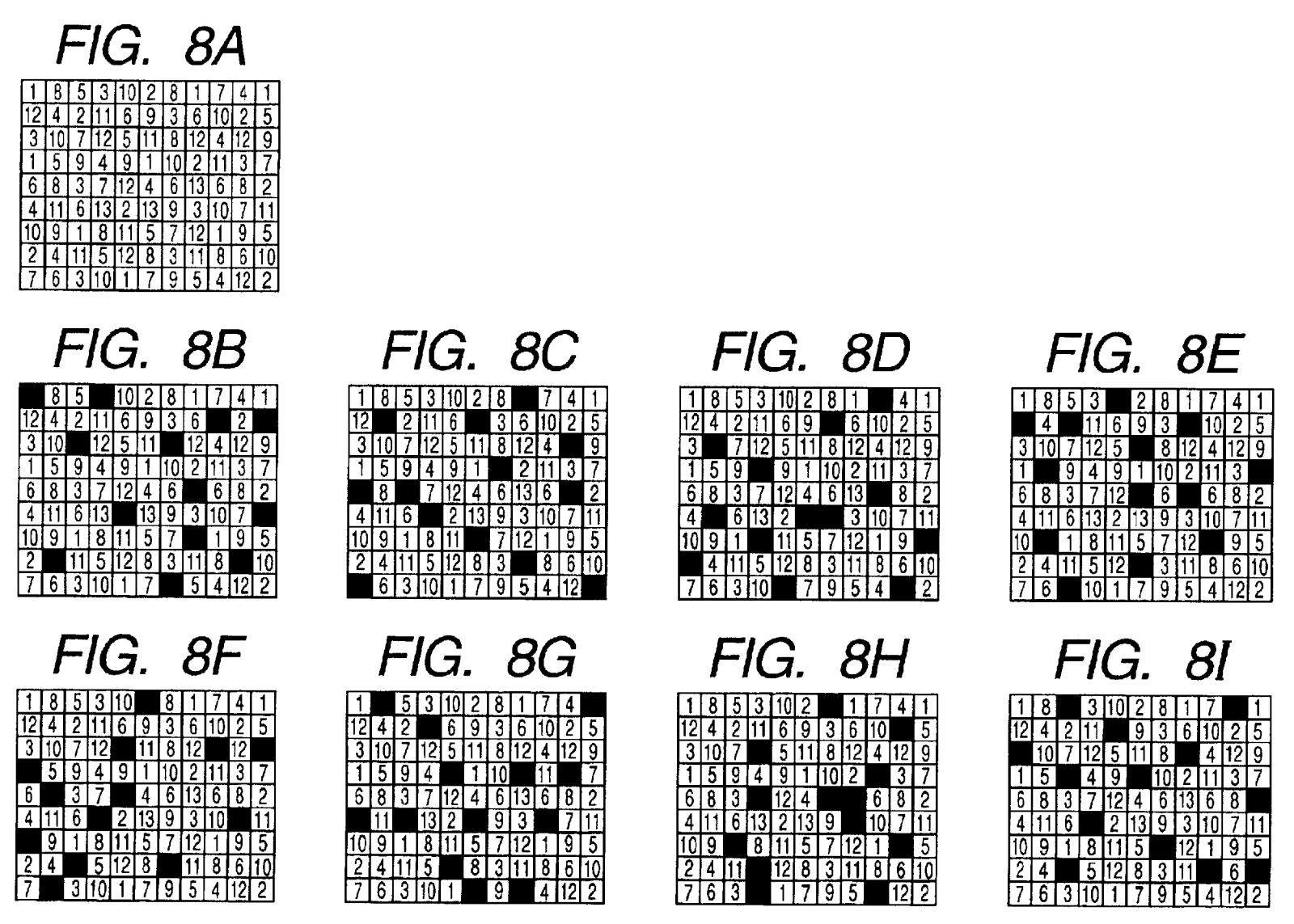

Furthermore, the content of the mode pattern memory 162 is not limited to that described in the foregoing embodiment. For example there may be employed contents as shown in FIGS. 8A to 8I. In FIG. 8A, each of numerals 1 to 13 represents a group of macroblocks executing the intraframe encoding periodically. For example a macroblock having a numeral 1 is encoded by the intraframe encoding mode always once within 8 frames of interframe encoding. The macroblocks having numerals 2 to 12 are encoded in a similar manner. The numeral 13 contains only three macroblocks, which are therefore encoded by the intraframe encoding mode with a repeating cycle of three frames. The manner of such encoding is shown in FIGS. 8B to 8I, as in the case of FIGS. 6B to 6I. In the foregoing there has been explained that the entire frame is covered by the I-macrobolock mode in a cycle of 8 frames, but the length of such cycle is also not restrictive.

Figure 9:
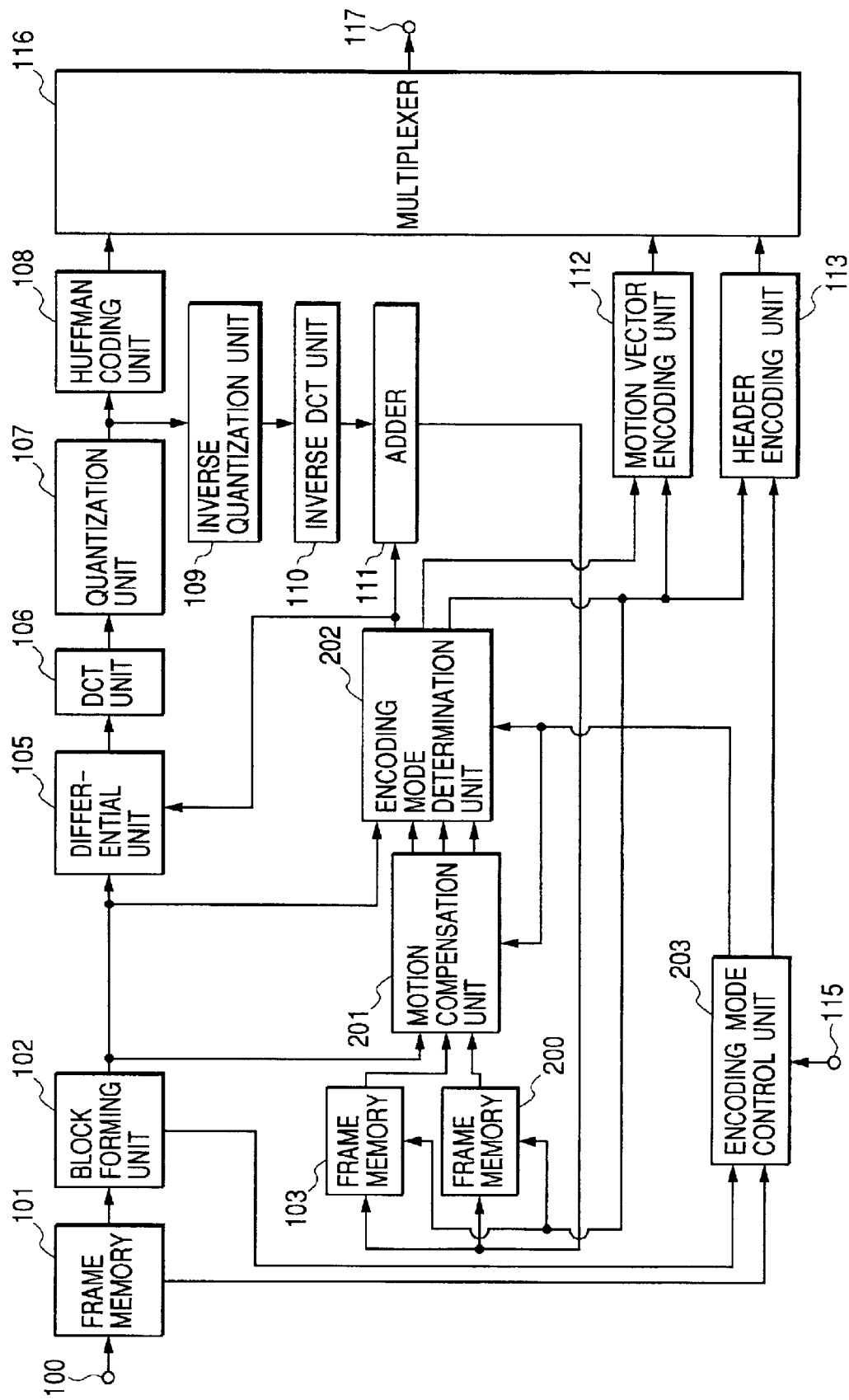
FIG. 9 is a block diagram showing the configuration of a video encoding unit 1002 shown in FIG. 2 in the second embodiment of the present invention.

FIG. 9 shows the configuration of the video encoding unit 1002 shown in FIG. 2, in a second embodiment of the present invention. This embodiment will be explained with the MPEG-1 encoding method as an example. In the MPEG encoding method, there exists a frame for executing prediction in both directions utilizing the preceding and succeeding frames, and the frame encoding mode with such prediction is called B-frame mode. Components equivalent to those of the foregoing embodiment shown in FIG. 4 will be represented by corresponding numbers and will not be explained further.

Referring to FIG. 9, a frame memory 200 has a function similar to that of the frame memory 103. In the I-frame mode or P-frame mode only, either of the frame memories 200, 103 storing a frame older in time is updated by the output of the addition unit 111. A motion compensation unit 201 executes, in addition to the functions of the motion compensation unit 104 shown in FIG. 4, calculation of the prediction value and motion vector of the macroblock subjected to backward prediction corresponding to the B-frame mode or the macroblock subjected to two-directional prediction. With respect to the respective encoding modes, the former is called a B-macroblock while the latter is called an M-macroblock. There are also provided an encoding mode determination unit 202, and an encoding mode control unit 203.

In FIG. 9, the various units are initialized prior to the operation, as in the first embodiment. The encoding mode control unit 203 executes encoding of the input moving image data with the I-frame mode for the first frame and thereafter with an interval of 15 frames, and, for other frames, with the P-frame mode utilizing an immediately preceding frame encoded with the I- or P-frame mode as the reference frame at an interval of 3 frames. Frames other than those encoded with the I- or P-frame mode are encoded with the B-frame mode. There is also generated a signal designating the determination of the encoding mode of each macroblock.

FIG. 10 is a block diagram showing the configuration of the encoding mode control unit 203 shown in FIG. 9, wherein components same as those in the foregoing embodiment shown in FIG. 5 will be represented by same numbers and will not be explained further.

Referring to FIG. 10, an address generation unit 210 calculates the address on the mode pattern memory 211, and a mode pattern memory 211 stores information relating to the encoding mode of the macroblock in the frame.

Figure 11A:
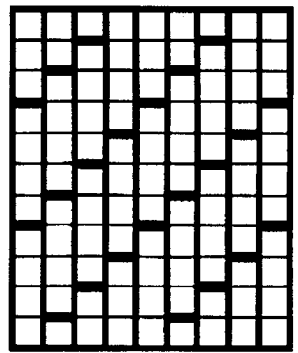
FIGS. 11A, 11B, 11C, 11D and 11E are views showing an example of arrangement of macroblocks which always execute intraframe encoding in the second embodiment of the present invention.
Figure 11B:
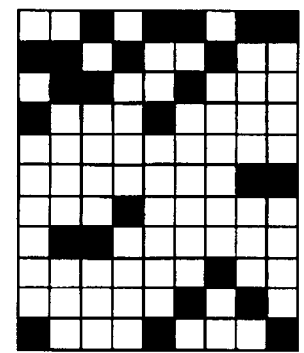

The mode pattern memory 211 stores patterns as shown in FIGS. 11B to 11E. As will be apparent from FIG. 11A, in the mode pattern memory 211, the group of blocks is composed of four macroblocks, different from that in the mode pattern memory 161.

Figure 11C:
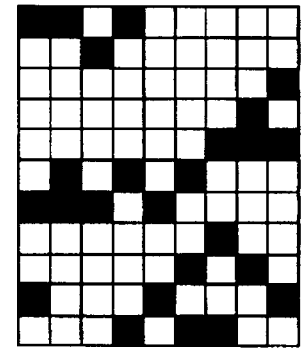
Figure 11D:
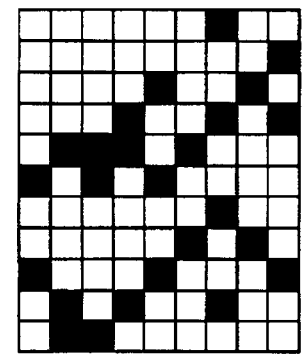
Figure 11E:
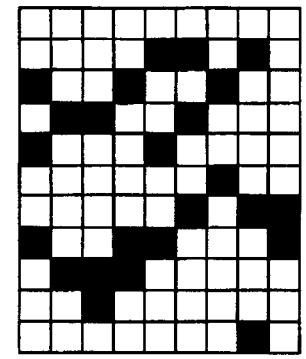

Thus, each macroblock in the entire frame is always encoded with the I-macroblock mode within 4 frames. If the frame count can be divided by 4, there is adopted the pattern shown in FIG. 11B, while the pattern shown in FIG. 11C, 11D or 11E is adopted if the remainder of the division 3, 2 or 1.

There are also provided an encoding mode control unit 215, and a selector 212 for selecting the input according to the output of the encoding mode control unit 215.

A frame mode setting unit 213 sets the I-frame mode, P-frame mode or B-frame mode for each frame as explained in the foregoing.

A frame counter 214 executes a downcount for each entry of a frame other than that of the I-frame mode, based on the information input from the terminal 154 and the outputs of the frame mode setting unit 213 and the encoding mode control unit 215. In the frame counter 214, a value 8 is set when the value thereof reaches 0, and a value 4 is set when a signal indicating the inhibition of decoding or the cancellation of inhibition is input from the terminal 154 and through the encoding mode control unit 215.

In the above-described configuration, the signal input from the terminal 150 is supplied to the frame counters 151, 214. The first frame is encoded with the I-frame mode. The count of the frame counter 151 is supplied to the frame mode setting unit 213, and, if the remainder in dividing the count with 15 is 1, there is selected the I-frame mode, but, if the remainder in dividing the count with 15 is not 1 but if the remainder in dividing the count with 3 is 1, there is selected the P-frame mode, and B-frame mode is selected in other cases. These results are output as the frame encoding mode from the terminal 153.

The block counter 159 is reset to 0 prior to the frame processing. The frame counter 214 is downcounted except in the I-frame mode and a value 8 is set when it reaches 0.

The block counter 159 executes counting in response to each input of a signal informing the block division output from the terminal 158. The address generation units 160, 210 receive the count of the block counter 159 and the count of the frame counter 214. The address generation unit 160 generates the address for reading the mode pattern memory 161, and the address generation unit 210 generates the address for reading the mode pattern memory 211.

The terminal 154 inputs information indicating whether the frame to be encoded is a frame starting the inhibition of decoding for security (image protection (protection of intellectual property (for example copyright))) or a frame cancelling the inhibition of decoding. The encoding mode control unit 213, if in the normal state, so controls the selector 212 as to output the output of the mode pattern memory 161 as the macroblock mode selection signal from the terminal 162.

If the frame is a frame starting the inhibition of decoding or a frame cancelling the inhibition of decoding, the encoding mode control unit 215 sets 4 in the frame counter 214. Thereafter the frame counter 214 executes downcounting for each frame and a value 8 is set when it reaches 0. Also the selector 212 is so controlled as to output the output of the mode pattern memory 211 as the macroblock mode selection signal from the terminal 162. The macroblock mode selection signal and the frame encoding mode are supplied to the encoding mode determination unit 202 shown in FIG. 9.

On the other hand, the data of the macroblock output from the block division unit 102 are supplied to the motion compensation unit 201, which executes motion compensation utilizing either of the frame memories 103, 200, which is closer in time, in case of the P-frame mode, or utilizing both frame memories 130, 200 in case of the B-frame mode.

In the B-frame mode, the motion compensation unit 201 executes motion compensation based on the input macroblockdata and the image data stored respectively in the frame memories 103, 200 thereby calculating the prediction values. Also these average values are averaged to obtain a prediction value in the bidirectional prediction. Also the prediction error is determined for each of the predictions and the input macroblock data, and the sum of the absolute values for each prediction is determined. Also the sum of the absolute values of the input macroblock data is calculated.

Then the smallest one of the sum of the absolute values is selected. If the aforementioned input macroblock data are smallest, the I-macroblock mode is temporarily determined. In this state the motion compensation unit 201 outputs 0 as the prediction value and does not output the motion vector.

If the sum of the absolute values of the prediction errors for the frame data preceding in time is smallest, the P-macroblock mode is temporarily determined. If the sum of the absolute values of the prediction errors for the frame data succeeding in time is smallest, the B-macroblock mode is temporarily determined. If the sum of the absolute values of the prediction errors for the bidirectional prediction is smallest, the M-macroblock mode is temporarily determined. In the P-, B- or M-macroblock mode, the motion compensation unit 201 outputs the corresponding prediction value and motion vector to the encoding mode determination unit 202.

Figure 12:
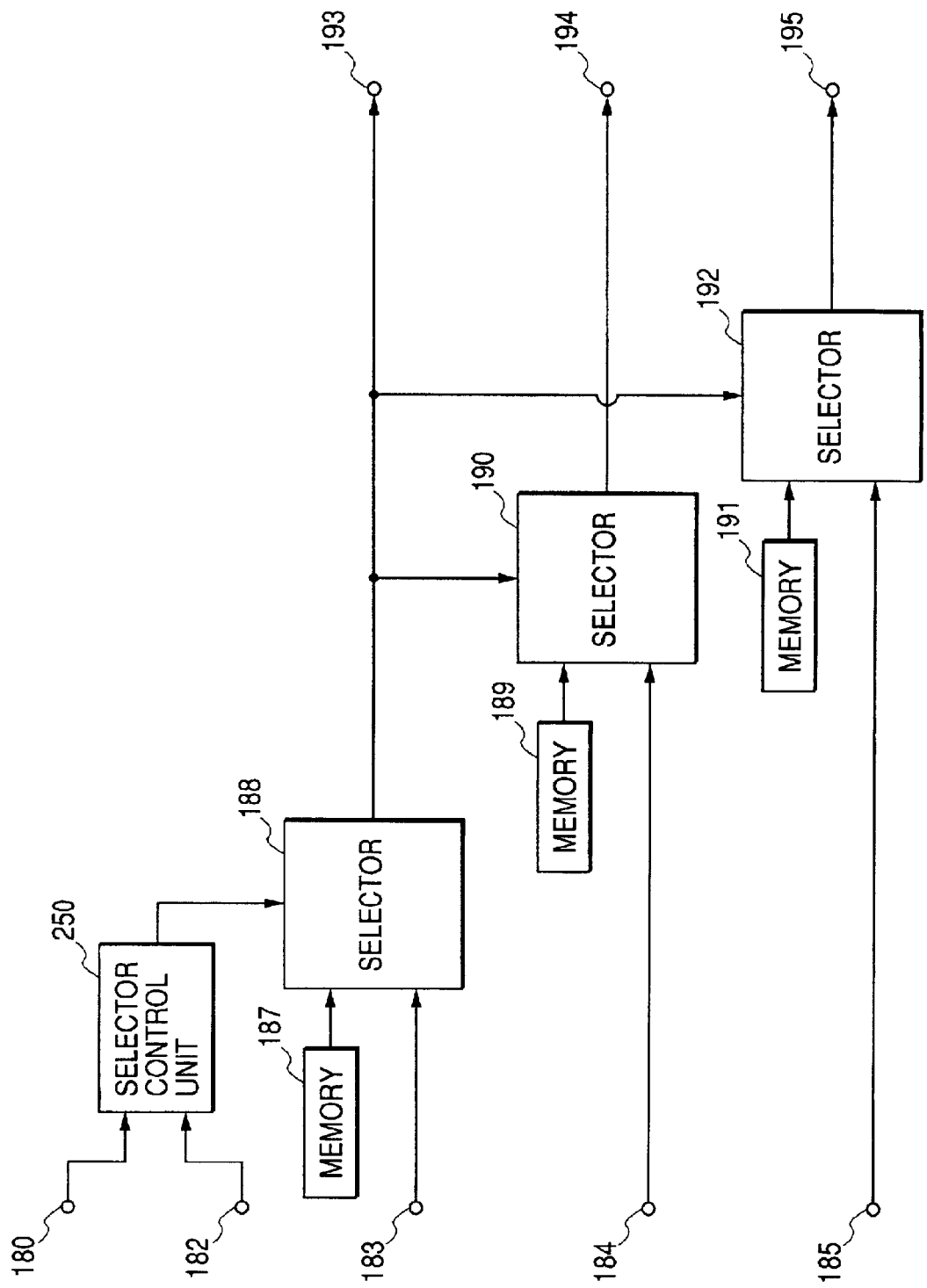
FIG. 12 is a block diagram showing the configuration of an encoding mode determination unit 202 shown in FIG. 9.

FIG. 12 is a detailed block diagram of the encoding mode determination unit 202, wherein components same as those in the foregoing embodiment shown in FIG. 7 will be represented by same number and will not be explained further.

Referring to FIG. 12, a selector control unit 250 generates a signal for controlling the input of the selector 188 according to the input signal from the terminals 180, 182.

In such configuration, the frame encoding mode input from the terminal 180 and the macroblock mode selection signal input from the terminal 182 are supplied to the selector control unit 250 for generating a control signal for controlling the selector 188 according to the following conditions.

In case the frame encoding mode is the I-frame mode, the control signal is so generated as to disregard the macroblock mode selection signal and to select the memory 187 for the input to the selector 188.

In case of the P- or B-frame mode, the control signal is so generated as to select the input to the selector 188 according to the input from the terminal 183. More specifically, the control signal is so generated as to select the input from the terminal 183 or the output of the memory 187 for input into the selector 188 respectively if the macroblock mode selection signal is 0 or 1.

Thereafter the selectors 190, 192 are controlled according to the macroblock encoding mode output from the selector 188 thereby outputting the encoding mode of each macroblock from the terminal 193, the prediction value from the terminal 194 and the motion vector from the terminal 195.

The selecting operations explained in the foregoing allows to easily determine the encoding mode of each block in such a manner that each macroblock is subjected to the intraframe encoding within a time shorter than in the normal state, after the inhibition of decoding by security (image protection (protection of intellectual property (for example copyright))) or after the cancellation of the inhibition. In this manner it is rendered possible to attain the normal display within a short time without inserting the frame of I-frame mode with a large code amount, while suppressing the deterioration in the image quality resulting from the security. Also the obtained encoded data completely comply with the standard method and do not require a special configuration in the decoding.

Also the repeating cycles of the I-frame mode, P-frame mode or B-frame mode are not limited to those in the foregoing embodiment, and need not be constant.

Also the group of blocks may be composed of a slice or even plural slices. Furthermore, the size or shape of the image is not limited to that in the foregoing embodiment.

Also the control of the block encoding mode is executed both at the inhibition of decoding by security and at the cancelling of inhibition, but such control may also be at either.

Furthermore, the contents of the mode pattern memories 162, 211 are not limited to those described in the foregoing embodiment.

Figure 13:
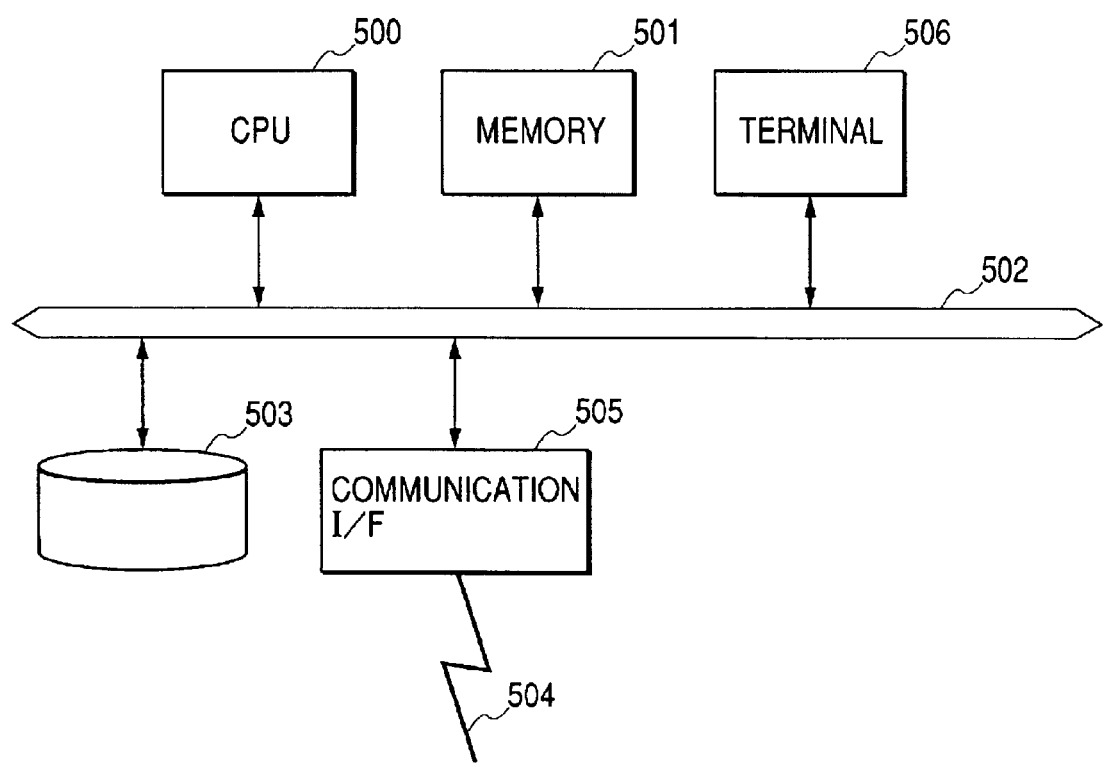
FIG. 13 is a block diagram showing the configuration of an image processing apparatus constituting a third embodiment of the present invention.

FIG. 13 is a block diagram showing the configuration of an image processing apparatus constituting a third embodiment of the present invention.

Referring to FIG. 13, a central processing unit (CPU) 500 controls the entire apparatus and executes various processes, and a memory 501 provides memory areas necessary for the operating system (OS), softwares and operations required for the control of the present apparatus.

There are also shown a bus 502 for connecting various units for exchanging data and control signals, a memory device 503 for accumulating moving image data, a communication channel 504 composed for example of a LAN, a public channel, a wireless channel or a broadcast radio wave, a communication interface 505 for transmitting encoded data to the communication channel 504, and a terminal 506 for setting security.

Figure 14:
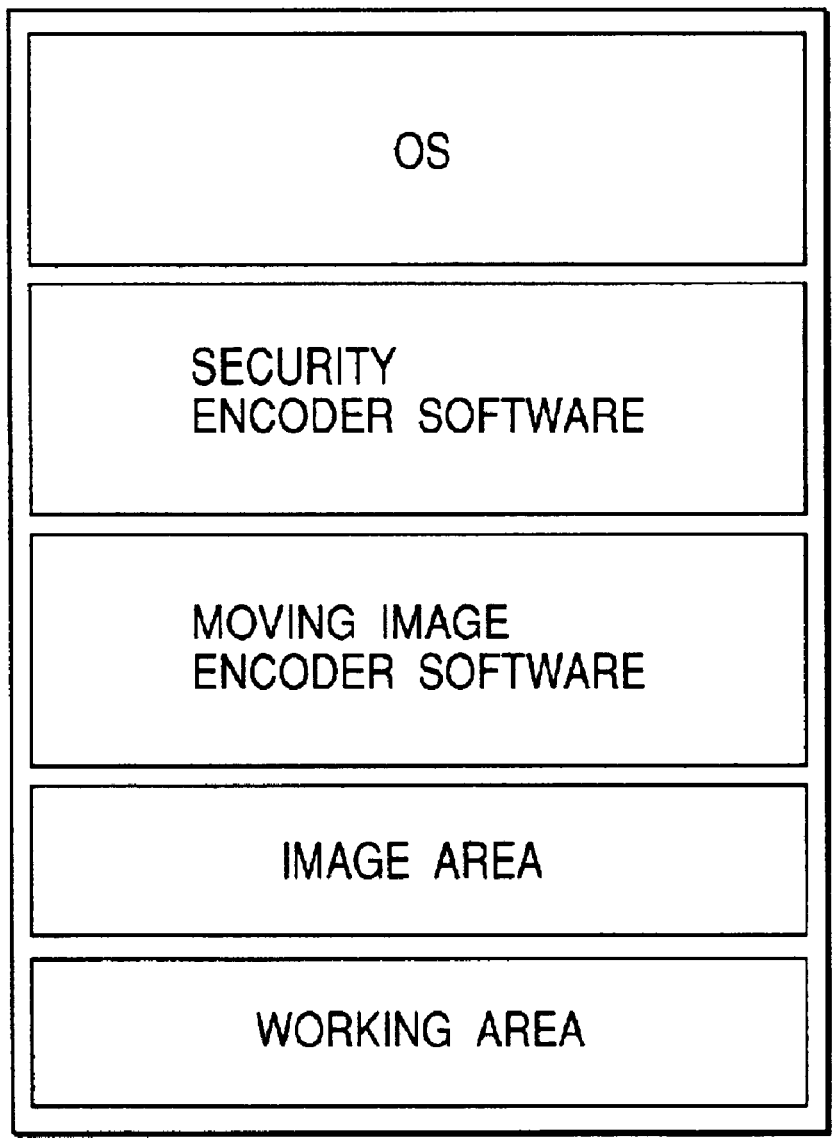
FIG. 14 is a view showing the state of use and storage of a memory 501.

FIG. 14 shows the state of use and storage of the memory 501.

The memory 501 stores an OS for controlling the entire apparatus and causing various softwares to operation, a security encoder software for encoding data for the protection of the copyright or the like, and a moving image encoder software for encoding the moving image.

There are also provided an image area for storing the moving image to be encoded, for the purpose of reference for example in the motion compensation, and a working area for storing parameters of various operations.

In such configuration, prior to the processing, the moving image data to be encoded are selected from the moving image data stored in the memory device 505, and there are input a frame for starting the inhibition of decoding for security (image protection (protection of intellectual right (for example copyright))) and a frame for cancelling the inhibition.

Then the security encoder software is activated to encode the security information and store it in a predetermined area of the memory device 505 or transmit it to the communication channel 504 through the communication interface 505.

In the following description, the moving image data are assumed to be encoded with the MPEG-1 method, but there may be employed any encoding method with motion compensation. Also the image size is assumed to QCIF (176×144 pixels), but such size is not restrictive. Also the cycle periods of the I-, P- and B-frame modes are assumed to be same as those in the second embodiment.

Figure 15:
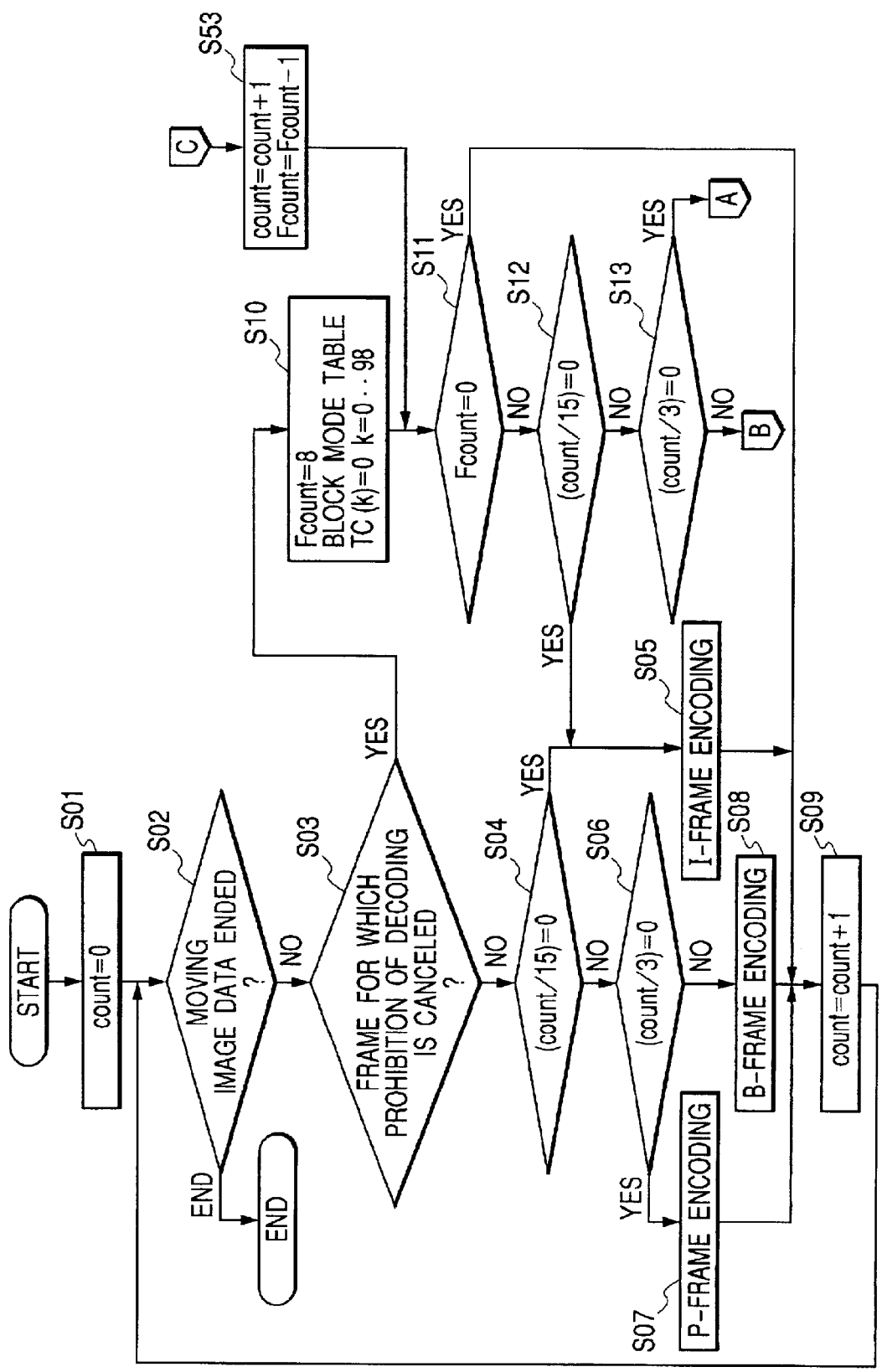
FIGS. 15, 16, 17 and 18 are flow charts showing the function of the third embodiment of the present invention.

In the following there will be explained the encoding operation of the moving image data stored in the memory device 505 by the CPU 500, with reference to flow charts shown in FIGS. 15, 16 and 17.

At first a step S01 resets a variable count, for counting the number of processed frames, to 0.

Then a step S02 discriminates whether the moving image data have been input from the memory device 505, and, if input, the data are stored in the image area of the memory 501 and the sequence proceeds to a step S03, but, if not input, the sequence is terminated.

A step S03 discriminates whether the frame to be processed is the last of the frames inhibiting the decoding input by the unrepresented user from the terminal 506, namely whether the inhibition of decoding has been canceled, and the sequence proceeds to a step S10 or S04 respectively if the inhibition has been canceled or not.

In the following there will be explained the process in case the inhibition has not been canceled. A step S04 divides the count by 15 and judges whether the remainder of the division is 0 or not. If the remainder is 0, the sequence proceeds to a step S05 to select the I-frame mode for the frame encoding mode, and executes encoding of the I-frame mode thereby generating the encoded data of the frame. The obtained encoded data are thereafter written in a predetermined area of the memory device 503 or transmitted to the communication channel 504 through the communication interface 505. Also an image same as the result of decoding of the transmitted image is stored as a reference image in the image area of the memory 501. Thereafter the sequence proceeds to a step S09 to add 1 to the count and then returns to the step S02.

If the remainder in the step S04 is not 0, a step S06 divides the count by 3 and judges whether the remainder is 0 or not. If the remainder is 0, the sequence proceeds to a step S07 to select the P-frame mode for the frame encoding mode and to execute encoding of the P-frame mode by referring to the reference image in the image area of the memory 501. Also an image same as the result of decoding of the transmitted image is stored as a reference image in the image area of the memory 501. Thereafter the sequence proceeds to a step S09 to add 1 to the count and then returns to the step S02.

If the remainder is not 0, a step S06 selects the B-frame mode for the frame encoding mode and executes encoding of the B-frame mode by referring to the reference image in the image area of the memory 501. Thereafter the sequence proceeds to a step S09 to add 1 to the count and then returns to the step S02.

In the following there will be explained the process in case the step S03 identifies that the frame to be processed is a frame for which the inhibition of decoding is canceled. After the cancellation, the I-macroblock mode is adopted at least once for all the macroblocks within a frame, within a predetermined period. In the following description, such period is assumed to consist of 8 frames, and the macroblocks to be encoded with the I-macroblock mode are assumed to be positioned in the patterns shown in FIGS. 6B to 6I. Corresponding to these patterns, one-dimensional tables are prepared, taking white as 0 and black as 1. In the work area of the memory 501, there is provided a variable $T_{FCount}(k)$ (Fcount=1 to 8; k=0 to 98). Thus $T_8(k)$ represents the content of FIG. 6B, and $T_7(k)$ to $T_1(k)$ respectively represents those of FIGS. 6C to 6I.

A step S10 sets 8 as the variable Fcount for downcounting the frames, and sets 0 in all the macroblock mode tables TC(k) (k=0 to 98). The macroblock mode tables TC(k) are used for checking the macroblocks encoded with the I-macroblock mode, and are provided in the working area of the memory 501. Then a step S11 discriminates whether the Fcount has become 0, and, if 0, the process in the predetermined period after the cancellation has been completed and the sequence proceeds to a step S09 for adding 1 to the count and then returns to the step S02. If the step S11 identifies that the Fcount is not 0, the sequence proceeds to a step S12.

A step S12 divides the count by 15 as in the step S04, and if the remainder of the division is 0, the sequence proceeds to the step S05 for encoding with the I-frame mode. In the I-frame, since all the macroblocks assume the I-macroblock mode, it is unnecessary to wait for the expiration of the predetermined period after the cancellation. If the remainder is not 0, the sequence proceeds to a step S13.

Figure 16:
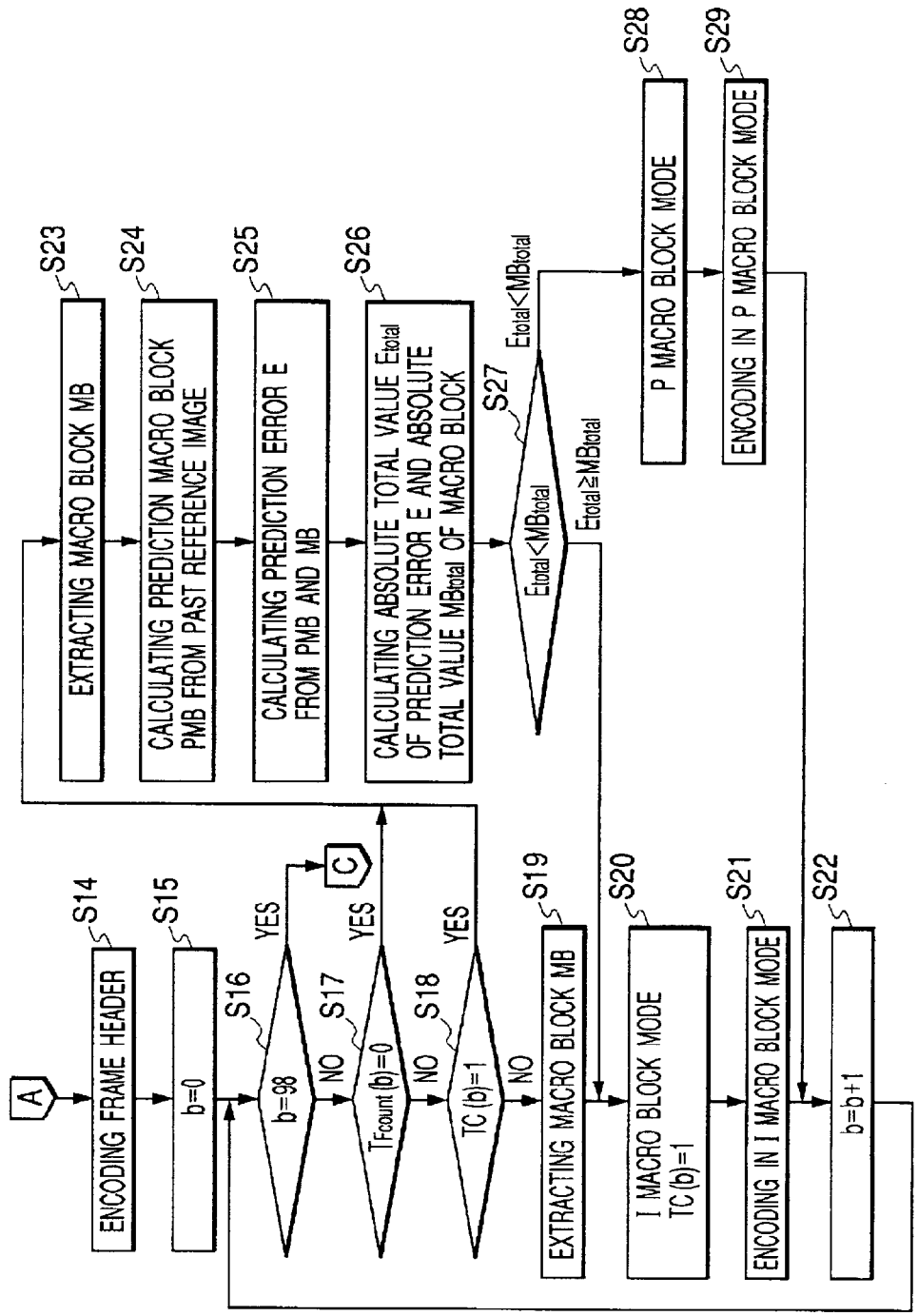
Figure 17:
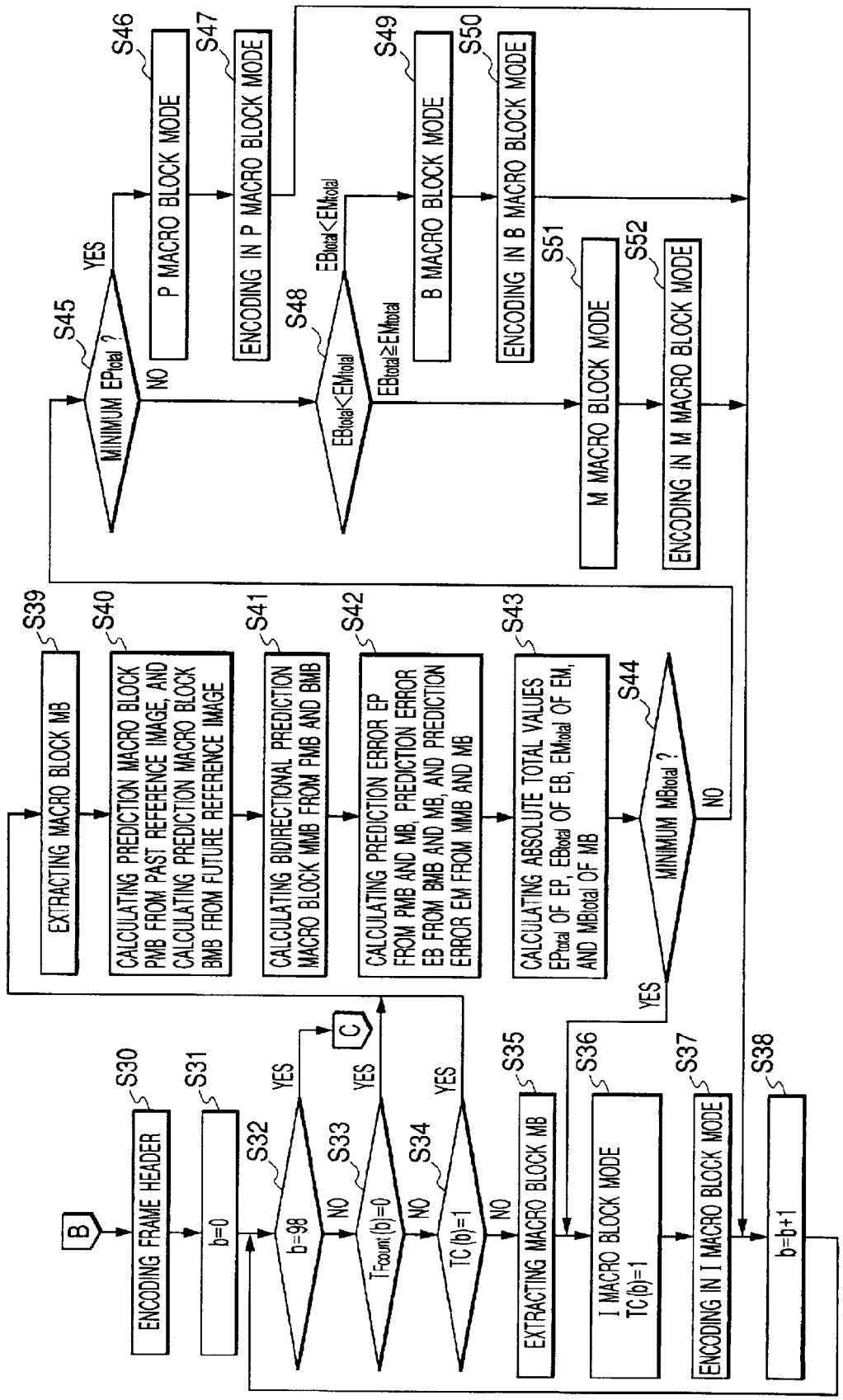

A step S13 divides the count by 3 as in the step S06, and if the remainder of the division is 0, the sequence proceeds to a step S14 in FIG. 16 for encoding with the P-frame mode. If the remainder is not 0, the sequence proceeds to a step S30 in FIG. 17 for encoding with the B-frame mode.

In the following there will be explained the encoding with the P-frame mode with reference to a flow chart shown in FIG. 16.

A step S14 generates and encodes frame header information, including for example that the frame to be encoded is to be encoded with the P-frame mode.

A step S15 sets 0 as a variable b indicating the position of the macroblock. The variable b starts from 0 at the macroblock at the upper left corner and increases in the order of encoding. As the QCIF format is considered in the present embodiment, the I-frame contains 99 macroblocks so that the variable b can assume values 0 to 98. A step S16 discriminates whether the process within the frame has been completed, by comparing the variable b with the number 99 of the existing macroblocks. If completed, the sequence proceeds to a step S53 in FIG. 15 to add 1 to the count of the frames and deduct 1 from the Fcount, in order to process a next frame, whereupon the sequence proceeds to the above-explained step S11.

If the process within the frame has not been completed, a step S17 discriminates whether every macroblock is to be encoded with the I-macroblock mode. Thus the sequence proceeds to a step S18 or S23 respectively if $T_{FCount}(b)$ is 1 or not.

A step S18 discriminates whether the macroblock after the cancellation has already been encoded with the I-macroblock mode. Such discrimination can be achieved according to whether the macroblock mode table TC(b) is 1 or 0. If it is 1, indicating that the encoding has already been made with the I-macroblock mode, the sequence proceeds to a step S23 since the I-macroblock mode is no longer necessary. On the other hand, if TC(b) is 0, the sequence proceeds to a step S19.

A step S19 cuts out the macroblock data MB from a position indicated by b in the frame stored in the image area of the memory 501. Then a step S20 selects the I-macroblock mode for encoding the macroblock, and sets a value 1 in the macroblock mode table TC(b), indicating the I-frame encoding. A step S21 encodes the macroblock data MB with the I-macroblock mode, and stores the image data obtained by decoding as a next reference image in a predetermined position in the image area of the memory 501. Then a step S22 adds 1 to the variable b indicating the position of the macroblock, in order to process a next macroblock.

On the other hand, a step S23 cuts out the macroblock data MB from a position indicated by b in the frame stored in the image area of the memory 501, and a step S24 executes motion compensation based on the reference image stored in the image area of the memory 501 to calculate prediction macroblock data PMB.

Then a step S25 executes subtraction in the unit of each pixel on the predicted macroblock data PMB and the cutout macroblock data MB to calculate prediction error data E. Then a step S26 calculates an absolute sum $E_{Total}$ which is the sum of the absolute values of the errors of the respective pixels in the calculated prediction error data E and a sum $MB_{Total}$ which is the sum of the absolute values of the differences of the respective pixel values of the macroblock data MB and the average value thereof.

A step S27 discriminates whether the macroblock is to be encoded with the I-macroblock mode or the P-macroblock mode by comparing $E_{Total}$ and $MB_{Total}$, and, if the latter is larger, the sequence proceeds to a step S28 for encoding with the P-macroblock mode, but, if the latter is smaller, the sequence proceeds to a step S20 for encoding with the I-macroblock mode.

A step S28 selects the P-macroblock mode for encoding the macroblock. A step S29 encodes the macroblock data MB with the I-macroblock mode utilizing PMB, and stores the image data obtained by decoding as a next reference image in a predetermined position in the image area of the memory 501. Then the sequence proceeds to the step S22 to add 1 to the variable b indicating the position of the macroblock, in order to process a next macroblock.

Thereafter the process from the step S17 to the step S29 is repeated for the macroblocks in the frame until the condition in the step S16 is satisfied.

In the following there will be explained the encoding with the B-frame mode with reference to a flow chart shown in FIG. 17.

A step S30 generates and encodes frame header information, including for example that the frame to be encoded is to be encoded with the B-frame mode.

A step S31 sets 0 as a variable b indicating the position of the macroblock. A step S32 discriminates whether the process within the frame has been completed, by comparing the variable b with the number 99 of the existing macroblocks. If completed, the sequence proceeds to a step S53 in FIG. 15 to add 1 to the count of the frames and deduct 1 from the Fcount, in order to process a next frame, whereupon the sequence proceeds to the above-explained step S11.

If the process within the frame has not been completed, a step S33 discriminates whether every macroblock is to be encoded with the I-macroblock mode. Thus the sequence proceeds to a step S34 or S39 respectively if $T_{FCount}(b)$ is 1 or not.

A step S34 discriminates whether the macroblock after being the cancellation has already been encoded with the I-macroblock mode. If TC(b) is 1, since the encoding has already been made with the I-macroblock mode, the sequence proceeds to a step S39. On the other hand, if TC(b) is 0, the sequence proceeds to a step S35.

A step S35 cuts out the macroblock data MB from the frame stored in the image area of the memory 501. Then a step S36 selects the I-macroblock mode for encoding the macroblock, and sets a value 1 in the macroblock mode table TC(b), indicating the I-frame encoding. A step S37 encodes the macroblock data MB with the I-macroblock mode. Then a step S38 adds 1 to the variable b indicating the position of the macroblock, in order to process a next macroblock.

On the other hand, a step S39 cuts out the macroblock data MB from a position indicated by b in the frame stored in the image area of the memory 501, and a step S40 executes motion compensation based on the past reference image stored in the image area of the memory 501 to calculate forward prediction macroblock data PMB and executes motion compensation based on the future reference image to calculate backward prediction macroblock data PMB.

Then a step S41 determines the average of the respective pixels from the forward prediction macroblock data PMB and the backward prediction macroblock data PMB to obtain bidirectional prediction macroblock data MMB.

Then a step S42 executes subtraction in the unit of each pixel on the PMB and the cutout macroblock data MB to calculate forward prediction error data EP. Similarly there are calculated the backward prediction error data EB from MB and BMB, and the bidirectional prediction error EM from MB and MMB.

Then a step S43 calculates the sum of absolute values of the errors of the respective pixels for each of the forward prediction error data EP, backward prediction error data EB and bidirectional prediction error data EM, thereby calculating the respective absolute sums $EP_{Total}$, $EB_{Total}$ and $EM_{total}$ and $MB_{Total}$ which is the sum of the absolute values of the differences of the respective pixel values of the macroblock data MB and the average value thereof.

A step S44 discriminates whether the macroblock is to be encoded with the I-macroblock mode or another mode by comparing $MB_{Total}$ with $EP_{Total}$, $EB_{Total}$ and $EM_{Total}$, and, if $MB_{Total}$ is smallest, the sequence proceeds to a step S36 for encoding with the I-macroblock mode, but, if it is not smallest, the sequence proceeds to a step S45.

A step S45 discriminates whether the macroblock is to be encoded with the P-macroblock mode or another mode by comparing $EP_{Total}$ with $EB_{Total}$ and $EM_{Total}$, and, if $EP_{Total}$ is smallest, the sequence proceeds to a step S46 for encoding with the P-macroblock mode, but, if it is not smallest, the sequence proceeds to a step S48.

A step S46 selects the P-macroblock mode for encoding the macroblock. A step S47 encodes the macroblock data MB with the P-macroblock mode. Then the sequence proceeds to the step S38 to add 1 to the variable b indicating the position of the macroblock, in order to process a next macroblock.

A step S48 discriminates whether the macroblock is to be encoded with the M-macroblock mode or the B-macroblock mode by comparing $EB_{Total}$ and $EM_{Total}$, and, if $EB_{Total}$ is smaller, the sequence proceeds to a step S49 for encoding with the B-macroblock mode, but, if otherwise, the sequence proceeds to a step S51 for encoding with the M-macroblock mode.

A step S49 selects the B-macroblock mode for encoding the macroblock. A step S50 executes motion compensation on the macroblock data MB based on the future reference image and executes encoding with the B-macroblock mode. Then the sequence proceeds to the step S38 to add 1 to the variable b indicating the position of the macroblock, in order to process a next macroblock.

A step S51 selects the M-macroblock mode for encoding the macroblock. A step S52 executes motion compensation on the macroblock data MB based on the past and future reference images and executes encoding with the M-macroblock mode. Then the sequence proceeds to the step S38 to add 1 to the variable b indicating the position of the macroblock, in order to process a next macroblock.

Thereafter the process from the step S33 to the step S52 is repeated for the macroblocks in the frame until the condition in the step S32 is satisfied.

The selecting operations explained in the foregoing allow to easily determine the encoding mode of each block in such a manner that each macroblock is subjected to the intraframe encoding within a predetermined time after the inhibition of decoding by security or after the cancellation of the inhibition. It is also rendered possible to reduce the number of blocks to be subjected to the intraframe encoding, by executing the encoding operation while monitoring the status of intraframe encoding within the frame. In this manner it is rendered possible to attain the normal display within a short time without inserting the frame of I-frame mode with a large code amount. Also the obtained encoded data completely comply with the standard method and do not require a special configuration in the decoding.

In the present embodiment, the status of intraframe encoding with the frame is monitored in the unit of a macroblock, but such unit is not limited to the such example. For example it is possible to further reduce the number of blocks executing the intraframe encoding, by executing the monitoring in the unit of a pixel and adding also a pixel already encoded by the I-frame mode for example by motion compensation and a pixel subjected to motion compensation by referring to such pixel itself.

Figure 18:
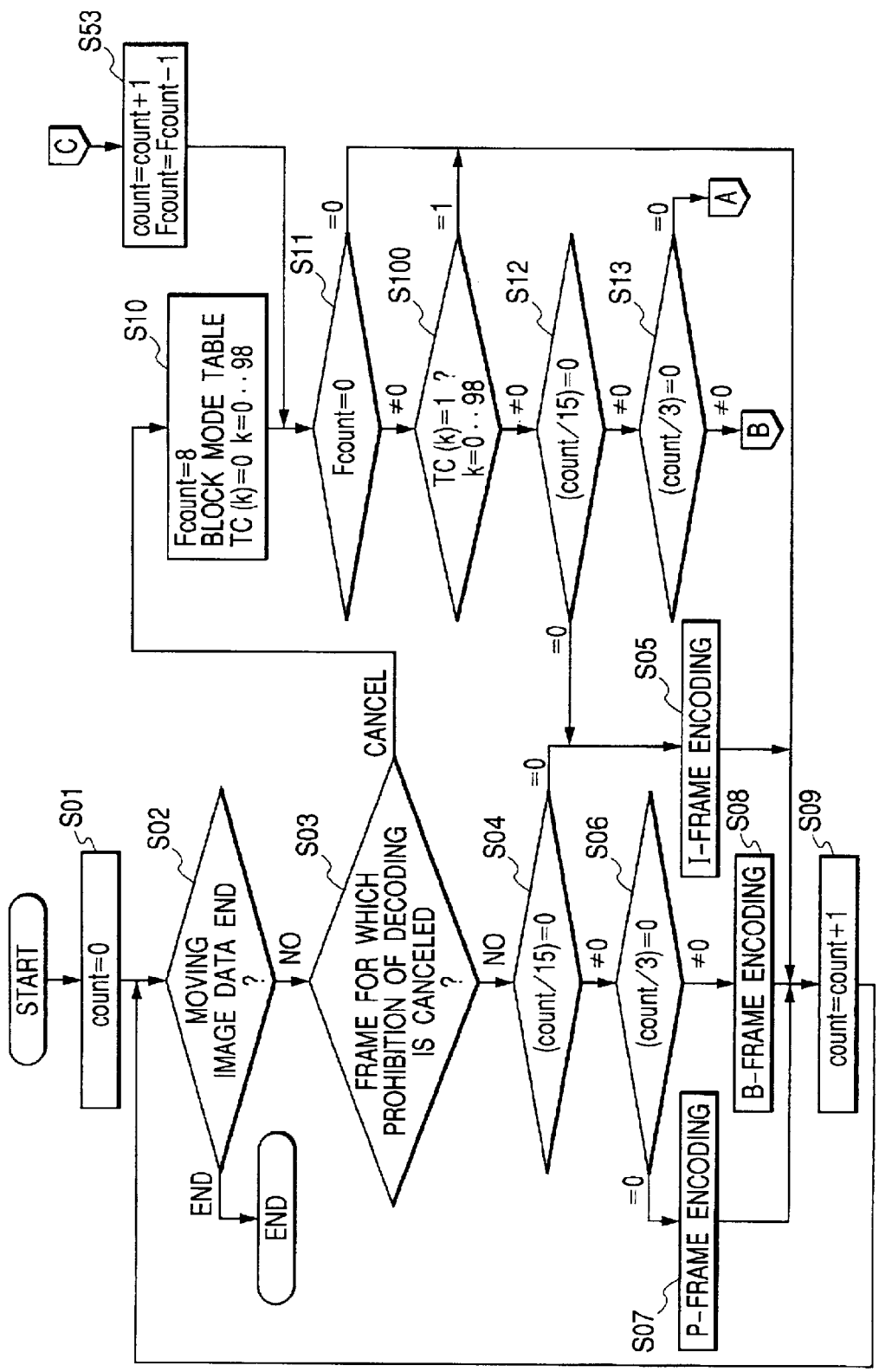

It is also possible to insert, between the steps S11 and S12, a step S100 as shown in FIG. 18 for discriminating whether all the macroblock mode tables TC(k) (k=0 to 98) is 1 prior to the frame processing, and, if all the tables are 1, to proceed to the step S02 and thereafter to execute the steps S03 to S09.

In this manner it is rendered possible to expedite the restoration of the normal state and to further decrease the number of blocks subjected to the intraframe encoding.

In the following, a fourth embodiment of the present invention will be explained with reference to the accompanying drawings.

Figure 19:
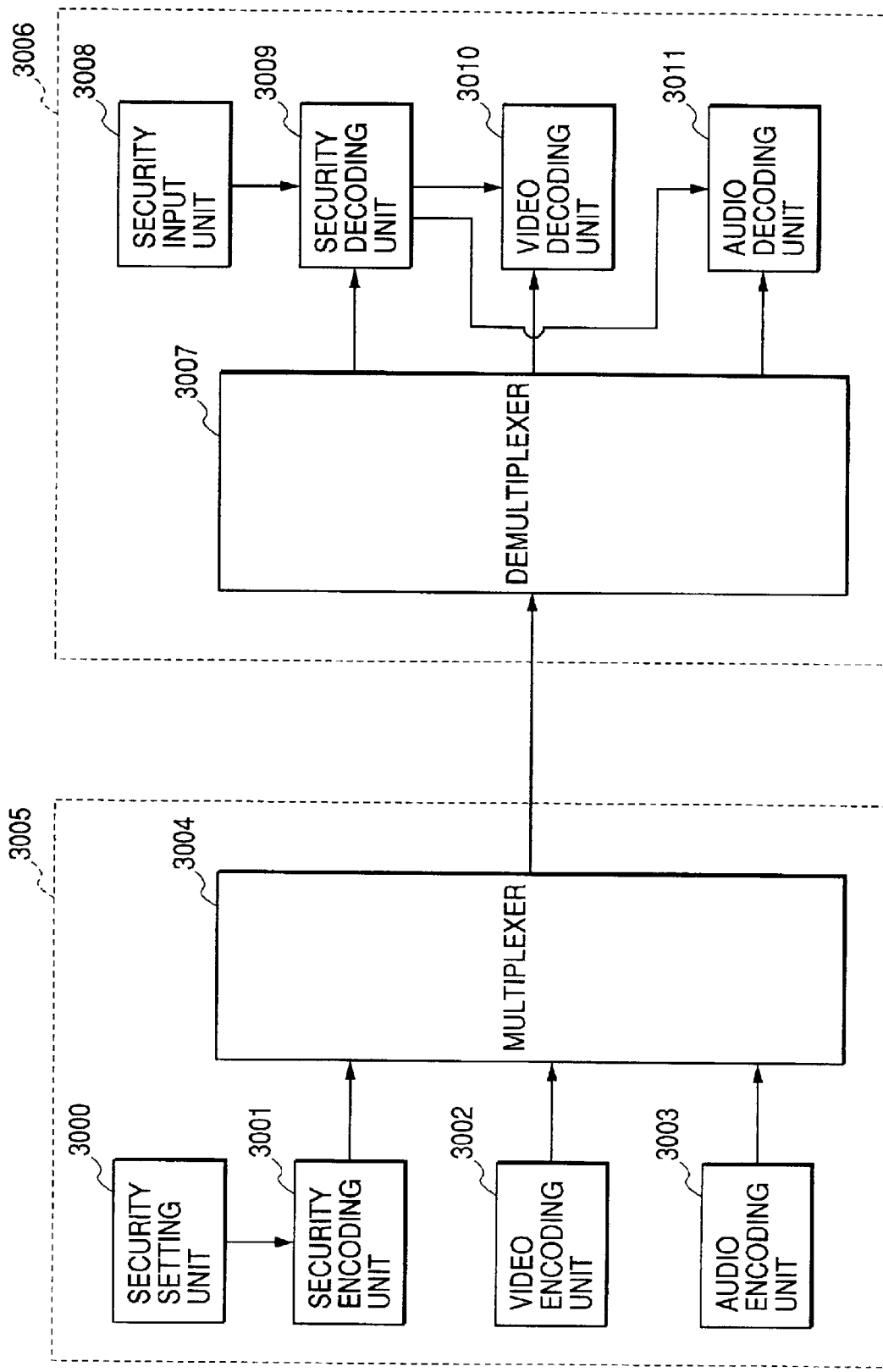
FIG. 19 is a block diagram showing the configuration of an image processing apparatus constituting fourth and fifth embodiments of the present invention.

FIG. 19 is a block diagram showing the configuration of an image processing apparatus constituting a fourth embodiment of the present invention.

In FIG. 19, there are shown a security setting unit 3000 for generating security information for permitting or inhibiting reproduction of all or a part of moving image, a security encoding unit 3001 for encoding the generated security information, a video encoding unit 3002 for encoding the moving image data, an audio encoding unit 3003 for generating encoded data relating to voice and soound, and a multiplexing unit 3004 for multiplexing the security encoded data, the moving image encoded data and the audio encoded data thereby generating moving image data.

In the following there will be explained the encoding process for the moving image data in an encoding apparatus 3005 of the above-described configuration.

In the present embodiment there will be explained a case of employing H.263 encoding method for encoding the moving image. Also for the purpose of simplicity, the size of the image to be encoded is assumed to be QCIF (176×144 pixels), but the present invention is not limited to such example. Also for the purpose of simplicity, the encoding is executed in the unit of a frame and is composed of an I-frame mode for executing intraframe encoding and a P-frame mode utilizing interframe correlation.

An operator (not shown) inputs image data into the video encoding unit 3002 and also inputs security information indicating a time for starting security (image protection (protection of intellectual property (for example copyright))), a time for ending the security and a cancel key for cancelling the security into the security setting unit 3000. The security setting unit 3000 rearranges the input security information in the order of start/cancel time of the security and holds such information. The security encoding unit 3001 encodes such security information and outputs it to the multiplexing unit 3004.

In the present embodiment, the configuration of the security encoded data is same as that shown in FIG. 3.

The audio encoding unit 3003 encodes audio data and outputs it to the multiplexing unit 3004. The multiplexing unit 3004 multiplexes the security encoded data, moving image encoded data and audio encoded data into moving image data which are output from the encoding apparatus 3005.

In the present embodiment, the security encoded data are multiplexed by the multiplexing unit 3004 at the head of the image data, but such method is not restrictive, and the security encoded data may be multiplexed with the moving image data on time-sharing basis.

The encoded data output from the encoding apparatus 3005 are input into a decoding apparatus 3006. A separation unit 3007 separates the moving image data into the security encoded data, the moving image encoded data and the audio encoded data. A security input unit 3008 is used for inputting or storing in advance authentication information required for cancelling the security. A security decoding unit 3009 decodes the security encoded data, thereby restoring the time for starting the security, time for cancelling the security and the security information required for cancelling the security. The aforementioned security information is compared with the authentication information input from the security input unit 3008, and the security is cancelled in case of proper authentication. Otherwise the security is applied to output security instructing information for inhibiting the decoding or cancelling the inhibition.

An audio decoding unit 3011 for decoding the audio encoded data stops or re-starts the decoding according to the security instructing information output from the security decoding unit 3009. A video decoding unit 3010 for decoding the moving image encoded data stops or re-starts the decoding according to the security instructing information output from the security decoding unit 3009.

Figure 20:
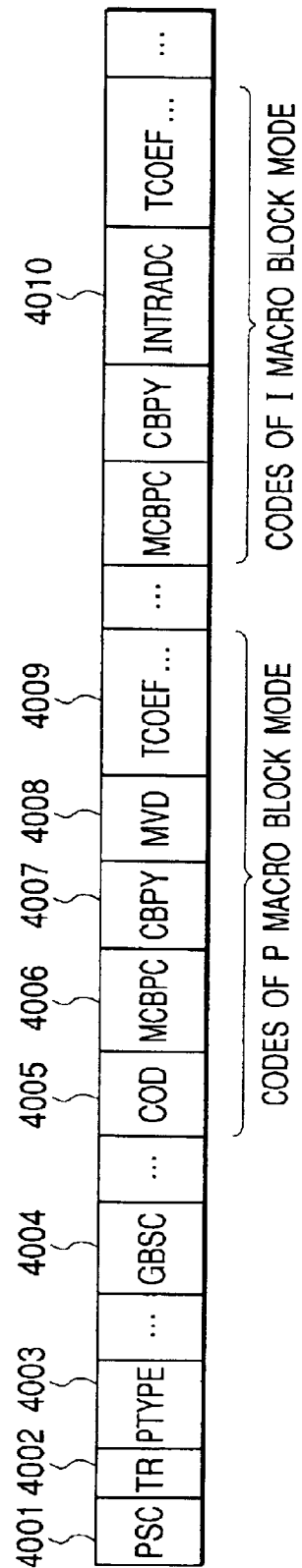
FIG. 20 is a view showing an example of moving image encoded data.

FIG. 20 shows an example of the input moving image encoded data. In the present embodiment, the video encoding unit 3002 employs the H.263 encoding method. For the details of the H.263 encoding method, reference is to be made to the ITU-T recommendation. In the present specification there will be explained parts thereof required for the description of the present embodiment.

In FIG. 20, there are shown a PSC code 4001 indicating the partition of the frames, a TR code 4002 indicating the relative time of the decoded frame, and a PTYPE code 4003 indicating the encoding mode of the frame. The PTYPE code represents an I-frame mode of executing the intra-encoding and a P-frame mode of executing inter-encoding. A GBSC code 4004 indicates the partition of GOB which is a group of macroblocks. The macroblock has an I-macroblock mode for executing intra-encoding and a P-macroblock mode for executing inter-encoding.

There are also shown codes 4005 to 4009 for the P-macroblock mode.

A COD code 4005 is a flag indicating whether the encoded data of macroblock are present or not, and such data occur only in the P-mode frame.

A MCBPC code 4006 indicates the encoding mode etc. of the macroblock. A CBPY code 4007 encodes a pattern representing the status of encoding of a luminance block. A MVD code 4008 indicates a motion vector. A TCOEF code 4009 encodes the result of quantization of the prediction error after DCT transformation. In the P-macroblock mode, 64 coefficients after being DCT are collectively encoded.

In the following there will be explained the macroblock encoded with the I-macroblock mode. The MCBPC and CBPY codes are same as those in the P-macroblock mode. In case of the I-macroblock mode, the DC component in the DCT coefficients is separately encoded. An INTRADC code 4010 indicates such DC component. The TCOEF code is similar to that in the P-macroblock but is different in that 63 coefficients are collectively encoded.

Again referring to FIG. 20, the separation unit 3007 receives the moving image data in succession from the encoding apparatus 3005. The security encoded data, multiplexed at the head of the moving image data, are input into the security decoding unit 3009 and are decoded into the start and end times of the security and the information required for authentication.

The security decoding unit 3009 also receives the authentication information from the security input unit 3008 and compares it with the information required for authentication. In case of proper authentication, the information of the start and end times of the corresponding security is erased and not output. Also in case of non-authentication, there is output the security instructing information indicating the start and end times of the security. Such security instructing information is supplied to the video decoding unit 3010 and the audio decoding unit 3011 for interrupting or re-starting the decoding.

Also the separation uint 3007 separates the moving image encoded data and the audio encoded data from the moving image data, and inputs the moving image encoded data into the video decoding unit 3010 and the audio encoded data into the audio decoding unit 3011. The audio decoding unit 3011 executes decoding according to the security instructing information from the security decoding unit 3009.

Figure 21:
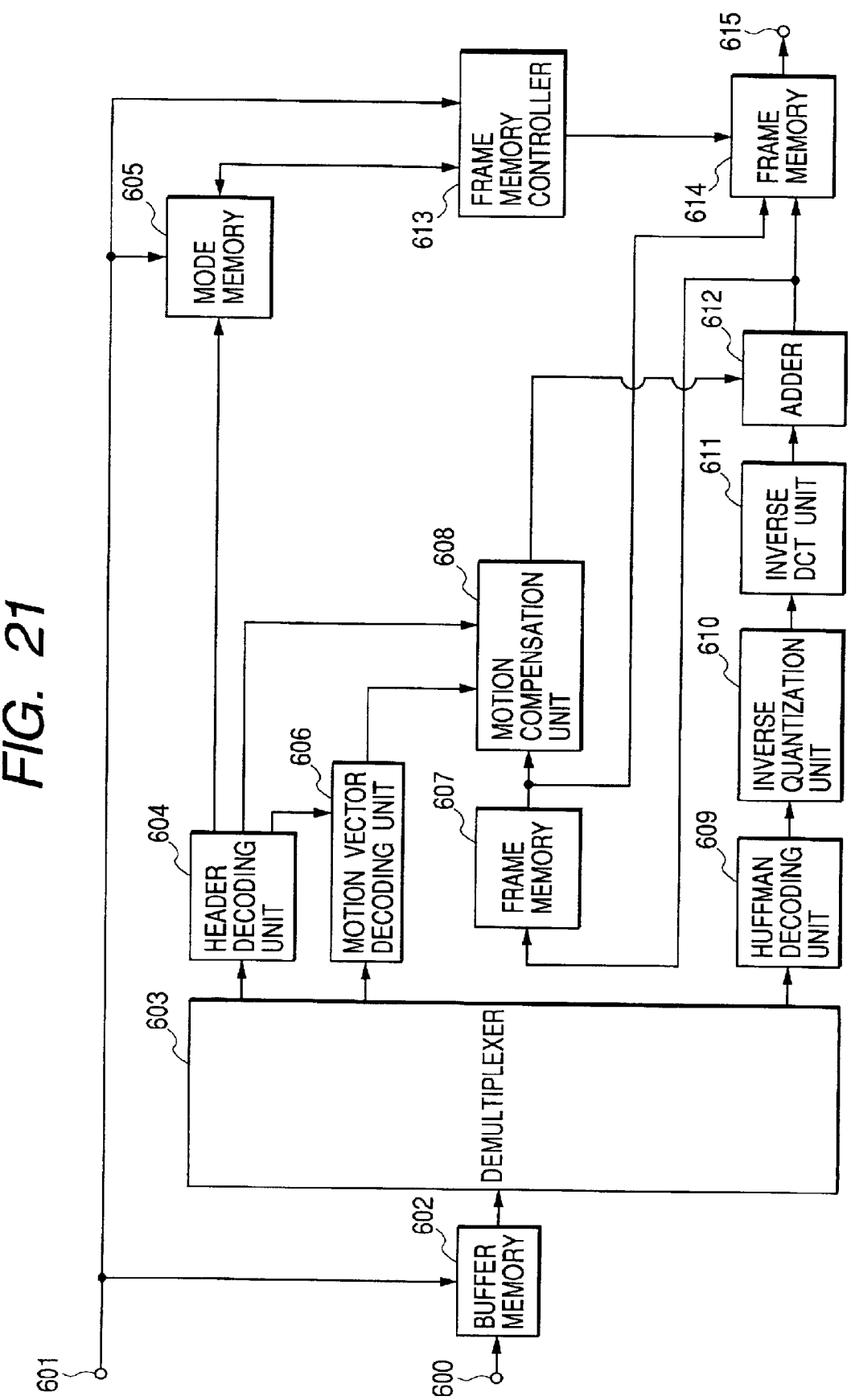
FIG. 21 is a block diagram showing the configuration of a video decoding unit 3010 in the fourth embodiment of the present invention.

In the following there will be explained the details of the video decoding unit 3010 which decodes the moving image encoded data. FIG. 21 shows the detailed configuration of the video decoding unit 3010.

Referring to FIG. 21, there are shown a terminal 600 for inputting the moving image encoded data from the separation unit 3007, and a terminal 601 for inputting the security instructing information for instructing the stopping/re-starting of decoding from the security decoding unit 3009.

A buffer memory 602 temporarily stores the moving image encoded data input from the terminal 600, and outputs it according to the security instructing information input from the terminal 601. While the decoding is inhibited, the stored data are discarded from the oldest ones.

A separation unit 603 separates, from the input moving image encoded data, codes relating to the header such as PSC code, TR code, PTYPE code, GBSC coede on GOB, COD code on each macroblock, MCBPC code etc., a code relating to the motion vector and consisting of MVD code, and texture codes consisting of CBPY code, INTRADC code and TCOEF code.

There are also provided a header decoding unit 604 for decoding the codes relating to the header and separated by the separation unit 603, a mode memory 605 for storing the encoding mode of the macroblock decoded in the header decoding unit 604, for each position of the corresponding macroblock, a motion vector decoding unit 606 for decoding the code relating to the motion vector, a frame memory 607 for storing the decoded image, and a motion compensation unit 608 for executing motion compensation according to the motion vector decoded in the motion vector decoding unit 606 while referring to the frame memory 607. However, a value 0 is output in case of the I-macroblock mode.

There are further provided a Huffman decoding unit 609 for decoding the Huffman code of the code relating to texture, an inverse quantizing unit 610 for inverse quantization of the quantized result obtained by Huffman decoding by the Huffman decoding unit 609, an inverse DCT unit 611 for inverse transformation of the DCT coefficients obtained by inverse quantization by the inverse quantizing unit 610, and an addition unit 612 for adding the pixel value of the prediction value obtained by inverse DCT in the inverse DCT unit 611 and the output of the motion compensation unit 608.

There are further provided a frame memory controller 613 for controlling the output of the frame memory 614 according to the instruction for inhibiting the decoding or cancelling the inhibition by the security instructing information input from the terminal 601, a frame memory 614 for storing the decoded image, and a terminal 615 for outputting the content of the frame memory 614 to the external.

In such configuration, various units are initialized prior to the function.

From the terminal 600, moving image encoded data are input in the unit of a frame starting from the PSC code. In case the security instructing information input from the terminal 601 indicates that the decoding is permitted, the buffer memory 602 outputs the encoded data stored therein in succession to the separation unit 603.

In case the security instructing information input from the terminal 601 indicates that the decoding is inhibited, the encoded between a frame starting the inhibition of decoding and a frame terminating the inhibition are discarded from the older frames if the capacity of the buffer memory 602 is deficient. Such state is called a decoding inhibition state. Also a state other than the decoding inhibition state is called a normal state.

At first there will be explained the normal state.

The buffer memory 602 outputs the encoded data input therein from the oldest one. The separation unit 603 separates the code relating to the header, the code relating to the motion vector and the texture code for supply respectively to the header decoding unit 604, the motion vector decoding unit 606 and the Huffman decoding unit 609. The header decoding unit 604 decodes the header information, thereby obtaining information such as the block encoding mode, macroblock address, macroblock encoding mode etc.

The mode memory 605 functions only in the decoding inhibition state and does not operate in the normal state.

In case the macroblock encoding mode obtained from the header decoding unit 604 indicates the P-macroblock mode, the motion vector decoding unit 606 decodes the input code on the motion vector, for supply to the motion compensation unit 608.

Based on the motion vector input from the motion vector decoding unit 606, the motion compensation unit 608 executes motion compensation on the image data stored in the frame memory 607, thereby generating prediction data of the macroblock for supply to the addition unit 612. Also in case the macroblock encoding mode from the header decoding unit 604 indicates the I-macroblock mode, the motion vector decoding unit 606 outputs 0.

The Huffman decoding unit 609 decodes the Huffman code on the DCT coefficients to obtain the quantization coefficients, which are subjected to inverse quantization by the inverse quantization unit 610 to reproduct the DCT coefficient. The inverse DCT unit 611 executes inverse DCT on the above-mentioned DCT coefficients to obtain pixel values of the prediction error.

The addition unit 612 adds the output of the motion compensation unit 608 and the output of the inverse DCT unit 111 to obtain the reproduced pixel values, which are storedin a predetermined position in the frame memory 614. In the normal state, the content of the frame memory 614 is output from the terminal 115.

In the following there will be explained the operations in case of transfer from the normal state to the decoding inhibition state.

When the security instructing information indicating the number or time of the initial frame inhibiting the decoding is input from the terminal 601, the buffer memory 602 receives and stores the encoded data from the terminal 600 until the frame in which the decoding is inhibited, but interrupts the storage thereafter. The encoded data prior to the inhibition of decoding are decoded in the same manner as in the normal state explained above. When the decoding of such data is completed, the frame memory controller 613 reads the image of the first frame from the frame memory 614 and stops the update of the frame memory 614.

In the following there will be explained the operations in case of cancellation of the inhibition and transfer to the normal state.

When the security instructing information indicating the number or time of the frame re-starting the decoding is input from the terminal 601, the buffer memory 602 is cleared and starts storage of the encoded data starting from such frame.

Figure 22A:
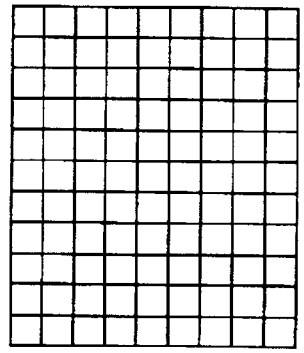
FIGS. 22A, 22B, 22C, 22D and 22E are views showing the content of a mode memory 605 in the fourth embodiment of the present invention.
Figure 22B:
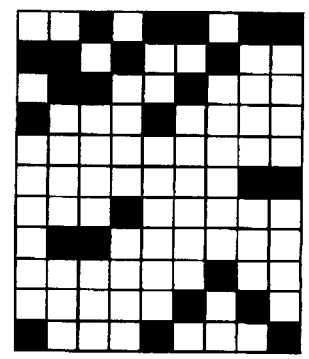
Figure 22C:
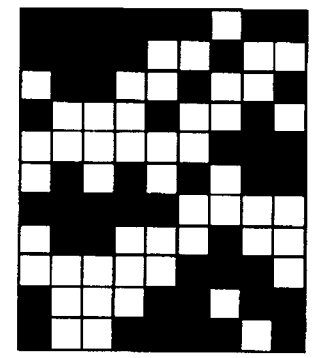
Figure 22D:
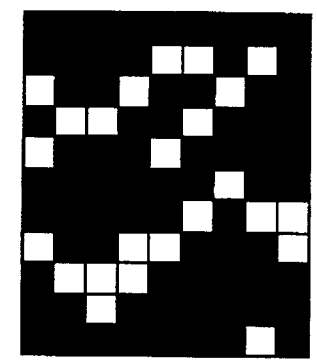
Figure 22E:
Figures 23A, 23B, 23C, 23D:
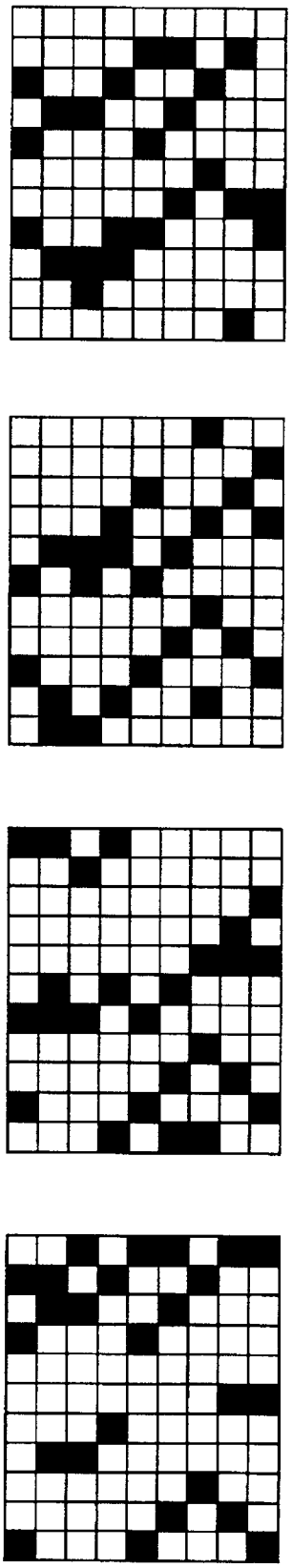
FIGS. 23A, 23B, 23C and 23D are views showing an example of arrangement of macroblocks which execute intraframe encoding in the fourth embodiment of the present invention.

The security instructing information input from the terminal 601 is also supplied to the mode memory 605 and the frame memory controller 613. The mode memory 605 has memory areas corresponding to the number of the macroblocks. As the present embodiment is explained with the QCIF format, there are provided 99 memory areas. FIG. 22A shows 99 memory areas in the mode memory, which 99 squares respectively correspond to macroblocks. A white square represents 0, and a black square represents 1 indicating an I-macroblock. In response to the re-start of decoding, the mode memory 605 is cleared prior to the start of decoding of the macroblocks.

Again referring to FIG. 21, the memory controller 613 monitors the content of the mode memory 605 and does not update the content of the frame memory 614 until all the content becomes 1.

The encoded data are supplied to the separation unit 603 starting from the frame where the decoding is re-started, and the header decoding unit 604 decodes the header information to obtain information such as the frame encoding mode, the macroblock encoding mode, etc.

If the frame encoding mode is the I-frame mode, the header decoding uit 604 inputs the mode memory 605 that all the macroblocks are I-macroblocks. Thus, 1 is stored in all the macroblocks of the mode memory 605. The frame memory controller 613 monitors the content of the mode memory 605, and, when all the macroblocks become 1, permits the renewal of the content of the frame memory 614. Thereafter the decoding is executed in the same manner as in the I-frame of the normal state, and the frame memory 114 is updated to output the reproduced image from the terminal 615. The frames thereafter are processed as in the normal state.

If the frame encoding mode is other than the I-frame mode, the header decoding unit 604 decodes the encoding mode for each macroblock, for supply to the motion vector decoding unit 606, the motion compensation unit 608 and the mode memory 605.

If the macroblock encoding mode is I-macroblock mode, the mode memory 605 changes the content, at the corresponding position of the macroblock, to 1. The motion vector decoding unit 606, the motion compensation unit 608, the Huffman decoding unit 609, the inverse quantization unit 610, the inverse DCT unit 611, the addition unit 612 and the frame memory 607 operate in the same manner as in the normal state. However, the writing into the frame memory 614 by the frame memory controller 113 is inhibited by the frame memory controller 113 until all the content of the mode memory 605 becomes 1.

As shown in FIGS. 22B to 22E, the area of 1 in the content of the mode memory 605 gradually increases with the progress of the frame decoding. FIGS. 22B to 22E indicate, in this order, the state of the mode memory 605 of a frame decoded later in time.

The frame memory controller 613 monitors the content of the mode memory 605, and, when all the macroblocks become 1, permits the update of the content of the frame memory 614. At this point, the content of the frame memory 607 is written into the frame memory 614 and is output from the terminal 615.

Thereafter the decoding is executed in the same manner as in the normal state, and the frame memory is updated to output the reproduced image from the terminal 615. The frames thereafter are processed in the normal state.

The above-described selecting operations allow to monitor the encoding mode of the macroblock after the inhibition of decoding by security (image protection (protection of intellectual property (for example copyright))) is canceled. In this manner it is rendered possible to suppress the deterioration in the image quality of the reproduced image, resulting from the mismatching of the motion compensation by security. Also there is not required any particular configuration in the input encoded data.

The video encoding unit 1002 executes encoding of the black macroblocks with the I-macroblock mode within 4 frames after the cancellation of security as shown in FIGS. 23A to 23D (namely each of all the macroblocks is encoded once with the I-macroblock mode within the period of 4 frames) to securely refresh the entire image with the I-macroblocks within a short period as shown in FIGS. 22B to 22E, thereby suppressing the image deterioration resulting from the mismatching of the motion compensation within a short time and providing the user with an appropriate reproduced image.

The present embodiment employs the H.263 encoding method for encoding the moving image, but there can naturally be employed other encoding methods such as H.261, MPEG-1 or MPEG-2. Also there can be employed an encoding method of setting security in the unit of an object, such as MPEG-4. In more general terms, there can be similarly employed any encoding method capable of selecting an intraframe encoding and an interframe encoding in the unit of a small area.

Also in the present embodiment, the configuration for example of the frame memory can be suitably modified for example according to the processing speed.

Also the present embodiment employs DCT for the orthogonal transformation, but such example is not restrictive and there can be likewise employed the wavelet transformation or the like, or a encoding method utilizing interframe correlation such as fractal transformation.

Also the encoding method of the security is not limited to the present embodiment. It is also possible to control the security for example by IPMP described in the MPEG-4 system (cf. ISO 14496-1) or to include the security on the time-sharing basis or in the moving image data.

Figure 24:
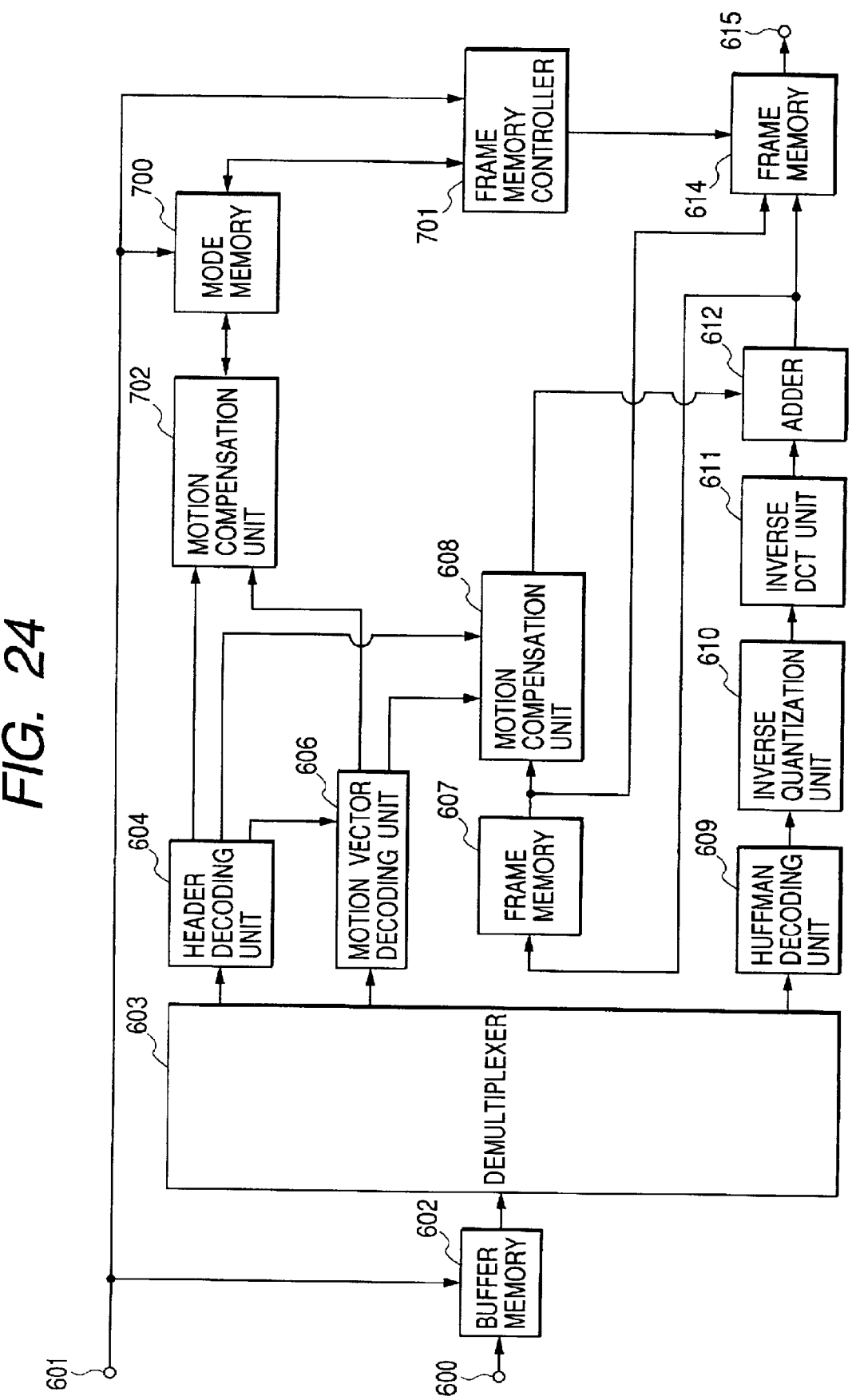
FIG. 24 is a block diagram showing the configuration of a video decoding unit 3010 in a fifth embodiment of the present invention.

FIG. 24 is a view showing the configuration of a video decoding unit 3010 in a decoding apparatus 3006 constituting a fifth embodiment of the present invention. Also the present embodiment employs the H.263 encoding method, but such example is not restrictive. In the present embodiment, components same as those in the fourth embodiment will be represented by same numbers and will not be explained further.

Referring to FIG. 24, there are provided a mode memory 700 for storing, for each pixel, the update state of pixel by the macroblock encoding mode decoded by the header decoding unit 604, a frame memory controller 701 for controlling the output of the frame memory 614 according to the security instructing information input from the terminal 601 and indicating the inhibition of decoding and the cancellation of inhibition, and a motion compensation unit 702 for motion compensation on the mode memory 700, referring to the memory 700 and according to the motion vector decoded by the motion vector decoding unit 606.

In the fifth embodiment, as in the fourth embodiment, various units are initialized prior to the operation. As in the fourth embodiment, moving image encoded data are input from the terminal 600 in the unit of a frame.

If in the normal state, the buffer memory 602 outputs its output in succession to the separation unit 603. The separation unit 603 separates the code relating to the header, the code relating to the motion vector and the texture code for respectively supply to the header decoding unit 604, the motion vector decoding unit 606 and the Huffman decoding unit 609. The header decoding unit 604 decodes the header information to obtain the frame encoding mode, the macroblock address, the macroblock encoding mode etc.

In the motion vector decoding unit 606, the Huffman decoding unit 609 and the subsequent components decodes, as in the fourth embodiment, the motion vector is decoded according to the encoding mode while the motion compensation is executed by the motion compensation unit 608, and the result of quantization decoded by the Huffman decoding unit 609 is processed through the inverse quantization unit 610, the inverse DCT unit 611 and the addition unit 612 to reproduce the pixel values which are output to the frame memories 614, 607 for storage in the predetermined position.

The frame encoding mode, the macroblock address and the macroblock encoding mode decoded by the header decoding unit 604 are supplied to the motion compensation unit 702. Also the motion vector output from the motion vector decoding unit 606 is input into the motion compensation unit 702.

The mode memory 700 is rendered capable of recording the status of piexl renewal in the unit of each pixel. The mode memory 700 is cleared to 0 only according to the instruction for inhibiting the decoding by the security instructing information input from the terminal 601. Each pixel, after being cleared to 0, is changed to 1 upon being encoded by the I-macroblock mode. Also the pixel, even in case of the P-macroblock mode, is changed to 1 in case the pixel value is determined by the motion compensation from a pixel of which the value is already changed to 1. Also in case the frame encoding mode is the I-frame mode, the value is changed to 1 corresponding to all the pixels. Therefore, as the first frame of encoding is the I-frame mode, all the pixels are always 1 in the normal state.

Assuming that $M(x, y)$ and $\hat{M}(x, y)$ as the values respectively before and after the decoding at a position $(x, y)$ of the mode memory 700, the motion compensation unit 702 determines $\hat{M}(x, y)$ as follows in case of the I-macroblock encoding mode:

$$\hat{M}(x, y)=1 \tag{1}$$

In case of the P-macroblock mode, if a pixel is motion compensated from a pixel $(x', y')$, $\hat{M}(x, y)$ is determined as follows:

$$\hat{M}(x, y)=M(x, y)|M(x', y') \tag{2}$$

wherein the symbol | indicates the logic sum.

$\hat{M}(x, y)$ is written into the mode memory 700 after the decoding in the unit of a frame and before the start of the decoding of a next frame.

In case all the content of the mode memory 700 is 1, the frame memory controller 701 outputs the content of the frame memory 614 from the terminal 615.

In the following there will be explained the operations in case of transfer from the normal state to the decoding inhibition state.

As in the fourth embodiment, when the security instructing information indicating the number or time of the initial frame inhibiting the decoding is input from the terminal 601, the buffer memory 602 receives and stores the encoded data from the terminal 600 until the frame in which the decoding is inhibited, but interrupts the storage thereafter. The encoded data prior to the inhibition of decoding are decoded in the same manner as in the normal state explained above. When the decoding of such data is completed, the frame memory controller 613 reads the image of the first frame from the frame memory 614 and stops the update of the frame memory 614.

In the following there will be explained the operations in case of cancellation of the inhibition and transfer to the normal state.

When the security instructing information indicating the number or time of the frame re-starting the decoding is input from the terminal 601, the buffer memory 602 is cleared and starts storage of the encoded data starting from such frame.

The security instructing information input from the terminal 601 is also supplied to the mode memory 700 and the frame memory controller 701. In response to the security instructing information mentioned in the foregoing, the mode memory 700 is all cleared to 0.

The frame memory controller 701 monitors the content of the mode memory 700, and does not update the content of the frame memory 614. until all the content of the mode memory 700 becomes 1.

The encoded data are input into the separation unit 603 starting from a frame of re-starting the decoding, and the header decoding unit 604 decodes the header information to obtain information such as the frame encoding mode, the macroblock address etc.

The motion vector decoding unit 606 decodes the motion vector separated by the separation unit 603. The motion compensation unit 702 determines the value according to the foregoing equations (1) and (2) depending on the macroblock encoding mode and the motion vector, as in the normal state.

Figure 25C:
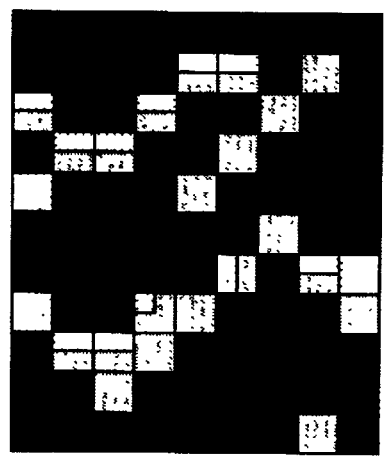
FIGS. 25A, 25B and 25C are views showing the content of a mode memory 700 in the fifth embodiment of the present invention.
Figure 25B:
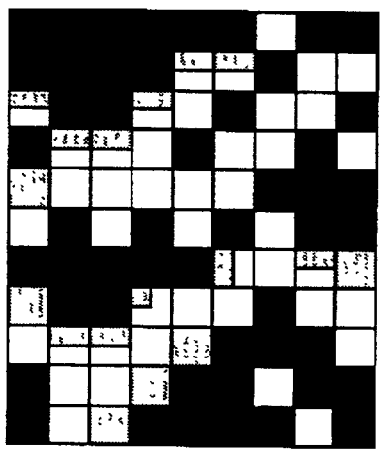
Figure 25A:
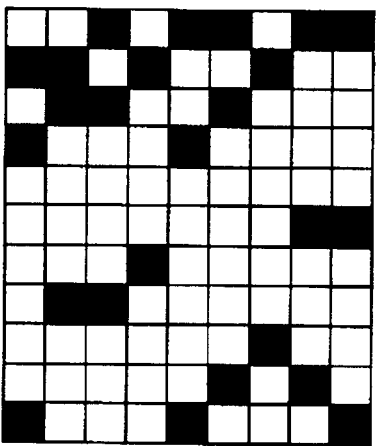

When the decoding of each frame is completed, the motion compensation unit 702 updates the mode memory 700 with thus determined value, as shown in FIGS. 25A to 25C, in which the black area indicates a portion of I-macroblock mode, the pale gray area indicates a portion assuming a value 1 by motion compensation from a pixel of a value 1 in the preceding frame, and the dark gray area indicates a portion having a value 1 by the previous motion compensation. The white area indicates a portion of a value 0. FIG. 25A shows the state of modes in the pixels in a frame where the decoding is re-started, while FIG. 25B shows the state after the decoding of a succeeding frame, and FIG. 25C shows the state after the decoding of a third frame after the re-starting of the decoding. With the proceeding of decoding of the frames, the area of the value 1 increases in the content of the mode memory 700. At the end of decoding of each frame, the frame memory controller 701 monitors the content of the mode memory 700.

The frame memory controller 700 inhibits the writing into the frame memory 614 until all the content of the mode memory 700 becomes 1.

The frame memory controller 700 monitors the content of the mode memory 700, and permits the update of the content of the frame memory 614 when all the macroblock pixels become 1. At this point, the content of the frame memory 607 is written into the frame memory 614 and is output from the terminal 615. Thereafter the decoding is executed in the same manner as in the normal state to update the frame memory 614 and to output the reproduced image from the terminal 615. Thereafter, all the pixels of the mode memory 700 are always 1 unless the decoding is inhibited, and the frame memory controller 701 executes processing in the normal state for the frame.

The above-described selecting operations allows to monitor the encoding mode in the unit of a pixel after the cancellation of inhibition of decoding by security (image protection (protection of intellectual property (for example copyright))), and to reflect the result of motion compensation. It is thus rendered possible not to reproduce or display an image involving deterioration resulting from the mismatching in the motion compensation by security, and to start reproduction or display from an image without such mismatching. Thus the motion compensation allows to re-start the reproduction within a period shorter than in case of monitoring the I-macroblock mode.

The present embodiment employs the H.263 encoding method for encoding the moving image, but there can naturally be employed other encoding methods such as H.261, MPEG-1 or MPEG-2. Also there can be employed an encoding method of setting security in the unit of an object, such as MPEG-4. Also the encoding mode is not limited to the I-frame mode and the P-frame mode, and it is also possible to utilize the frame memory 607 and the mode memory 700 in plural units and to cause the motion compensation unit 702 to calculate $\hat{M}(x, y)$ in the same principle also in the B-frame memory. In such case the bidirectional prediction is executed according to an equation:

$$^\wedge M(x', y') = M_b(x', y') * M_f(x', y') \quad (3)$$

wherein $M_f(x', y')$ and $M_b(x', y')$ are values respectively from a frame forward in time and a frame backward in time, and * indicates logic product.

Also in the present embodiment, the configuration for example of the frame memory can be suitably modified for example according to the processing speed.

Also the present embodiment employs DCT for the orthogonal transformation, but such example is not restrictive and there can be likewise employed the Wavelet transformation or the like, or a encoding method utilizing inter-frame correlation such as fractal transformation.

Also the encoding method of the security is not limited to the present embodiment. It is also possible to control the security for example by IPMP described in the MPEG-4 system (cf. ISO 14496-1) or to include the security on the time-sharing basis or in the moving image data.

Also in the present embodiment, the mode memory 700 is managed in the unit of a pixel, but such example is not restrictive. For example it is easily possible to achieve a precision of a half pixel by utilizing a memory of a capacity of four times, so that an improvement in precision can be achieved. It is also possible to constitute a block by 2×2 pixels thereby reducing the precision and also reducing the memory capacity.

Figure 26:
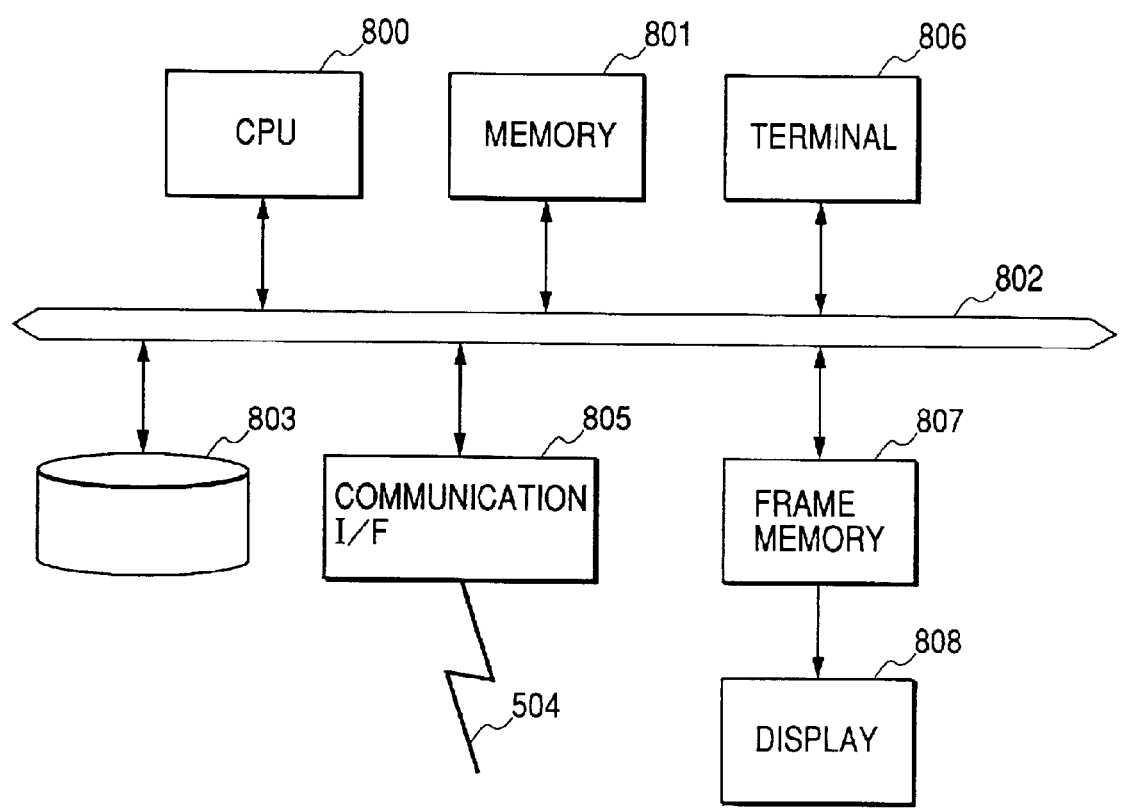
FIG. 26 is a block diagram showing the configuration of an image processing apparatus in the fifth embodiment of the present invention.

FIG. 26 is a block diagram showing the configuration of an image processing apparatus constituting a sixth embodiment of the present invention.

Referring to FIG. 26, a central processing unit (CPU) 800 controls the entire apparatus and executes various processings, and a memory 801 provides memory areas required for an operating system (OS) for controlling the present apparatus, and for softwares and operations.

There are also provided a bus 802 for connecting various devices for exchanging data and control signals, a memory device 803 for storing the encoded data of a moving image, a communication channel 804 composed for example of a LAN, a public channel, a wireless channel or a broadcast radio wave, a communication interface 805 for receiving the encoded data from the communication channel 804, a terminal 806 to be used by a user (not shown) for various settings, a frame memory 807, and a display 808 for displaying the content of the frame memory 807.

Figure 27:
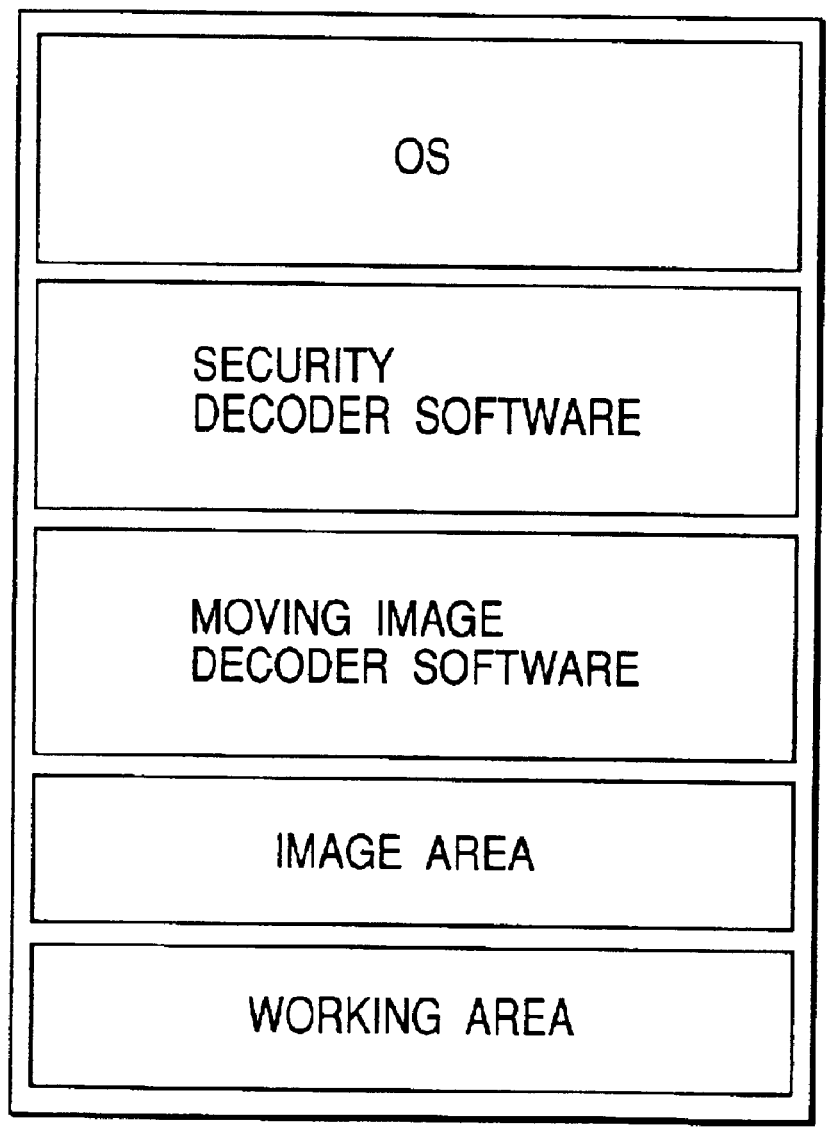
FIG. 27 is a view showing the state of use and storage of a memory 801.

FIG. 27 shows the state of use and storage of the memory 801.

The memory 801 stores an operating system for controlling the entire apparatus and operating various softwares, a security decoder software for decoding encoded data in which copyright or the like is protected, and a moving image decoder software for decoding the encoded data of the moving image.

There are also provided an image area for storing an image for reference at the motion compensation in the decoding operation, and a working area for storing parameters for various operations.

In such configuration, prior to the start of processing, the moving image data to be decoded are selected from the terminal 806, among the moving image encoded data stored in the memory device 803. In the present embodiment, the moving image data are assumed to be encoded with the MPEG-1 method, but such example is not restrictive and there may be employed any encoding method with motion compensation. Also the image size is assumed to QCIF (176×144 pixels), but such size is not restrictive. Also it is assumed that the encoding is executed with the I-frame mode and the P-frame mode, but it is naturally possible to utilize the B-frame mode.

Then the security decoder software is activated and the security information is decoded and stored in the working area of the memory 801.

In the following there will be explained the decoding operation of the CPU 800 for the moving image encoded data stored in the memory device 803, with reference to flow charts shown in FIGS. 28, 29 and 30.

At first a step S101 decodes the sequence header of the selected encoded data to obtain information required for the decoding and display such as a frame rate, an image size, a bit rate etc., and executes setting of necessary information for the softwares and the frame memory 807.

Then a step S102 discriminates whether the moving image encoded data have been input from the memory device 803, and, if input, the encoded data are stored in the unit of a frame into the working area of the memory 801 and the sequence proceeds to a step S103. On the other hand, if the encoded data have not been input, the sequence is terminated.

A step S103 discriminates whether the encoded data to be processed belong to a frame of which decoding is inhibited, according to the security information stored in the working area of the memory 801. Namely the step S103 discriminates whether the inhibition of decoding has been canceled, and the sequence proceeds to a step S104 or S102 respectively if the inhibition is canceled or not.

A step S104 discriminates, according to the security information of the input frame, whether the frame is immediately after the cancellation of the inhibition of decoding. If the frame is not immediately after the cancellation of the inhibition of decoding, the sequence proceeds to a step S105 to decode and judge the frame mode. The sequence proceeds to a step S106 or S107 respectively in case of an I-frame mode or a P-frame mode.

A step S106 decodes the I-frame mode and the result is written into the image area of the memory 801, and is also written into the frame memory 807 in a step S108. The content of the frame memory 807 is displayed on the display 808. Then the sequence proceeds to the step S102 for processing a next frame.

A step S107 executes decoding of the P-frame mode by referring to the image of a preceding frame stored in the image area of the memory 801, and the result of decoding is written into the image area of the memory 801.

A step S108 also writes the result of decoding into the frame memory 807, of which content is displayed on the display 808. Then the sequence proceeds to the step S102 for processing a next frame.

In case the step S104 identifies, based on the security information, that the input frame is immediately after the cancellation of the inhibition of decoding, the sequence proceeds to a step S109.

A step S109 provides a 1-bit table TC(x, y) (x=0 to 175, y=0 to 143) for each pixel, in the working area of the memory 801. Since the present embodiment is based on the QCIF format, x and y are sized as mentioned above. All these tables (x, y) are cleared to 0.

A step S110 discriminates whether all the aforementioned tables TC(x, y) are 1, and, if all 1, the sequence proceeds to a step S108 to write the decoded image, stored in the image area of the memory 801 into the frame memory 807, of which content is displayed on the display 808. Then the sequence proceeds to the step S102 for processing a next frame.

In case the step S110 identifies that all the tables are not 1, the sequence proceeds to a step S111 to decode and discriminate the frame mode. If it is I-frame mode, the sequence proceeds to the step S106 to thereafter execute the normal decoding operation as explained in the foregoing.

Figure 29:
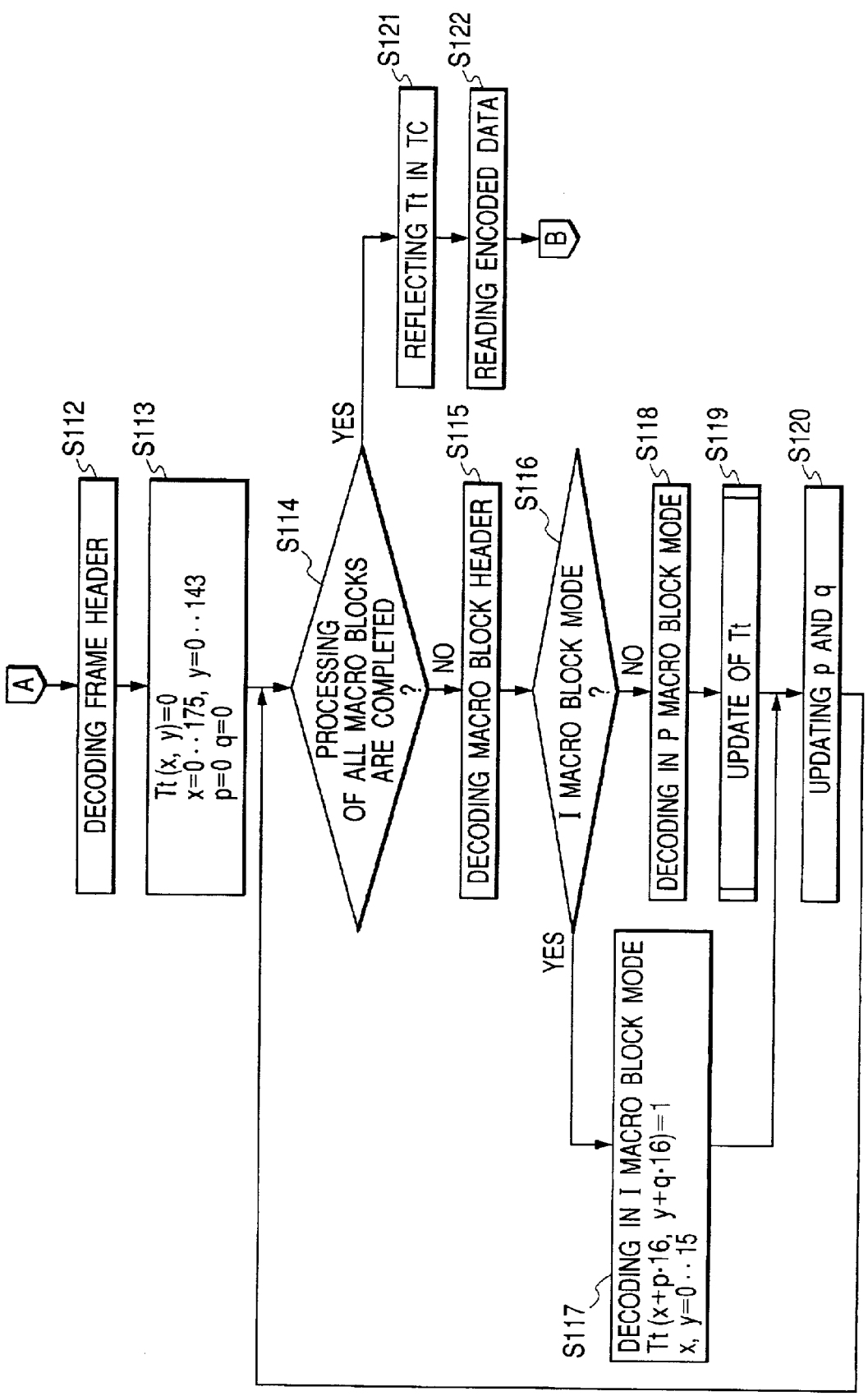

In case the step S111 identifies a P-frame mode, the sequence proceeds to a step S112 in FIG. 29. A step S112 decodeds the encoded data of the frame header, thereby obtaining various information.

Then a step S113 provides a 1-bit table Tt(x, y) (x=0 to 175, y=0 to 143) for each pixel, in the working area of the memory 801, and all these tables (x, y) are cleared to 0. Also variables p, q indicating the position of the macroblock are provided in the work area of the memory 801, and set to 0. The variables p, q respectively indicate the address of the macroblock in the main and sub scanning directions.

A step S114 discriminates, based on the variables p, q, whether all the macroblocks have been processed.

If all the macroblocks have been processed, the sequence proceeds to a step S121, which calculates the logic sum of the table Tt(x, y) and the table TC(x, y) for each pixel and overwrites the table TC(x, y) with thus obtained value. Then a step S122 reads the encoded data of a next frame from the memory device 803 and stores such data in the working area of the memory 801. Then the sequence proceeds to the step S110 in FIG. 28 and discriminates the content of the table TC(x, y) to continue the aforementioned operation.

If all the macroblocks have not been processed, the sequence proceeds to a step S115 which decodes the header information of each macroblock to obtain the encoding mode thereof. Then the sequence proceeds to a step S116.

A step S116 judges the encoding mode of the macroblock, and the sequence proceeds to a step S117 or S118 respectively in case of the I-macroblock mode or the P-macroblock mode.

In case the step S116 identifies the I-macroblock mode, a step S117 executes decoding with the I-macroblock mode, the stores the result in a predetermined position in the image area of the memory 801 and replaces the value of a position of the corresponding macroblock of the table Tt secured in the working area with 1, namely:

$$Tt((x+p\cdot16), (y+q\cdot16))=1 \quad (4)$$

wherein x=0 to 15, y=0 to 15.

Then a step S120 updates the variables p, q. At first 1 is added to the variable p. When the variable p becomes larger than 11, 1 is added to the variable q and the variable p is reset to 0. Then the sequence proceeds to a step S114, and all the macroblocks have been processed if the variable q has reached 10. Thereafter there is executed the decoding operation explained in the foregoing.

In case the step S116 identifies that the mode is not the I-macroblock mode, a step S118 executes decoding with the P-macroblock mode and writes the pixel data in a predetermined position of the image area of the memory 801. Then a step S119 executes the motion compensation of the table Tt.

Figure 30:
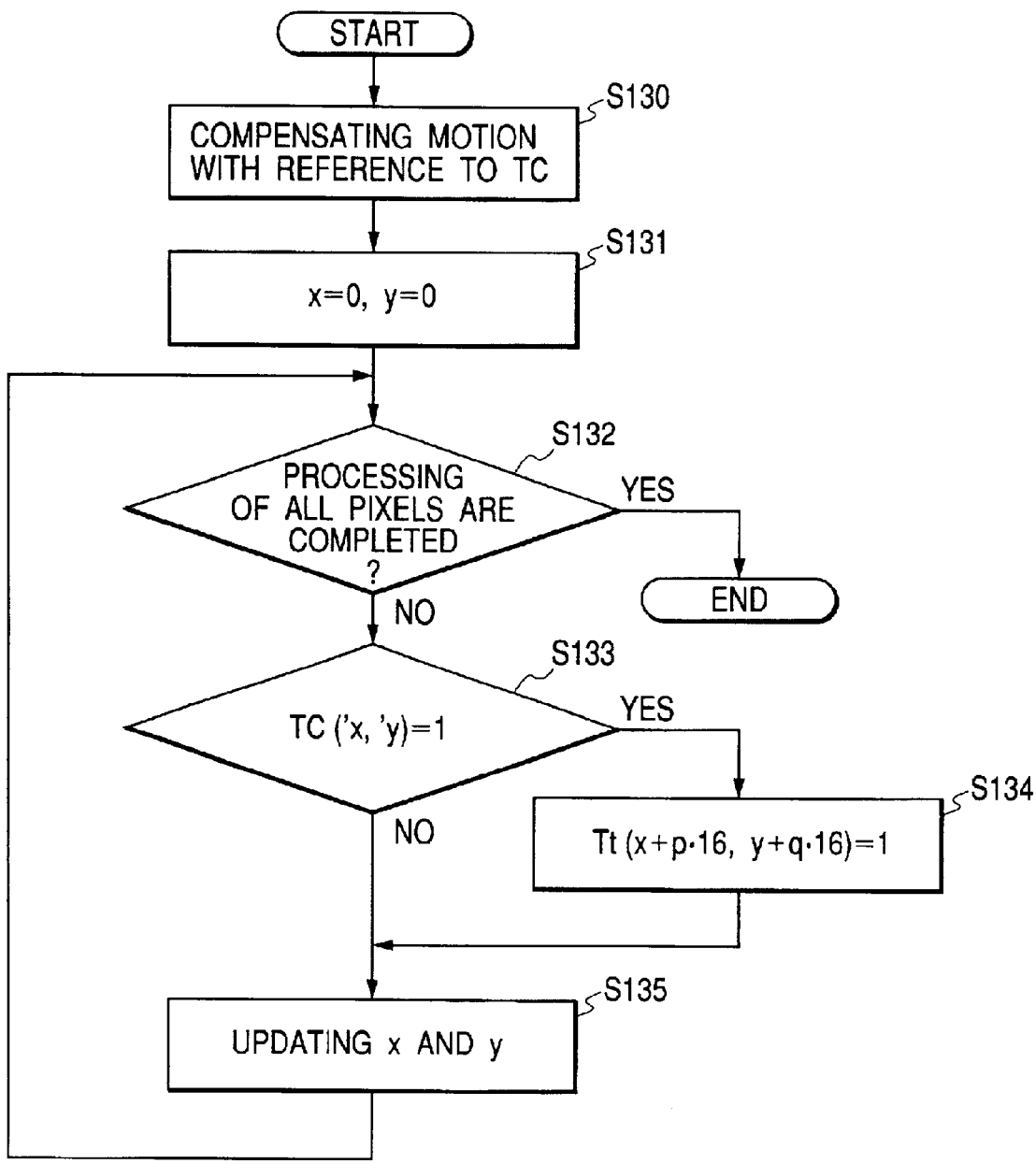

FIG. 30 shows the process flow of the motion compensation of the table Tt.

Referring to FIG. 30, a step S130 executes motion compensation based on the table TC of the working area, according to the motion vector obtained in the decoding, and reads the pixel value corresponding to the macroblock. The value obtained by the motion compensation is formed as a table TC('x, 'y).

A step S131 sets the variables x, y indicating the pixel position in the macroblock at 0 and the sequence proceeds to a step S132.

A step S132 discriminates whether the processing has been completed for all the pixels in the macroblock. If completed, the sequence proceeds to the step S120 in FIG. 29 to update the variables p, q and continue the process in the above-described manner.

If all the pixels have not been processed, a step S133 discriminates whether the value of the table TC('x, 'y) corresponding to the coordinate (x, y) in the macroblock is 1, and, if 1, the sequence proceeds to a step S134.

A step S134 sets the value of the table Tt(x+p·16, y+q·16) at 1. This process is executed for all the pixels of the macroblock.

Then a step S135 updates the variables x, y. At first 1 is added to the variable x. When the variable x becomes larger than 15, 1 is added to the variable y and the variable x is reset to 0. Then the sequence proceeds to a step S132, and all the pixels in the macroblock have been processed if the variable y has reached 16. Thereafter executed is the decoding operation starting from the step S120 in FIG. 29.

Again referring to FIG. 29, if the step S114 identifies that all the macroblocks have been processed, the sequence proceeds to the step S121, which calculates the logic sum of the table Tt(x, y) and the table TC(x, y) for each pixel and overwrites the table TC(x, y) with thus obtained value. Then the step S122 reads the encoded data of a next frame from the memory device 803 and stores such data in the working area of the memory 801.

Figure 28:
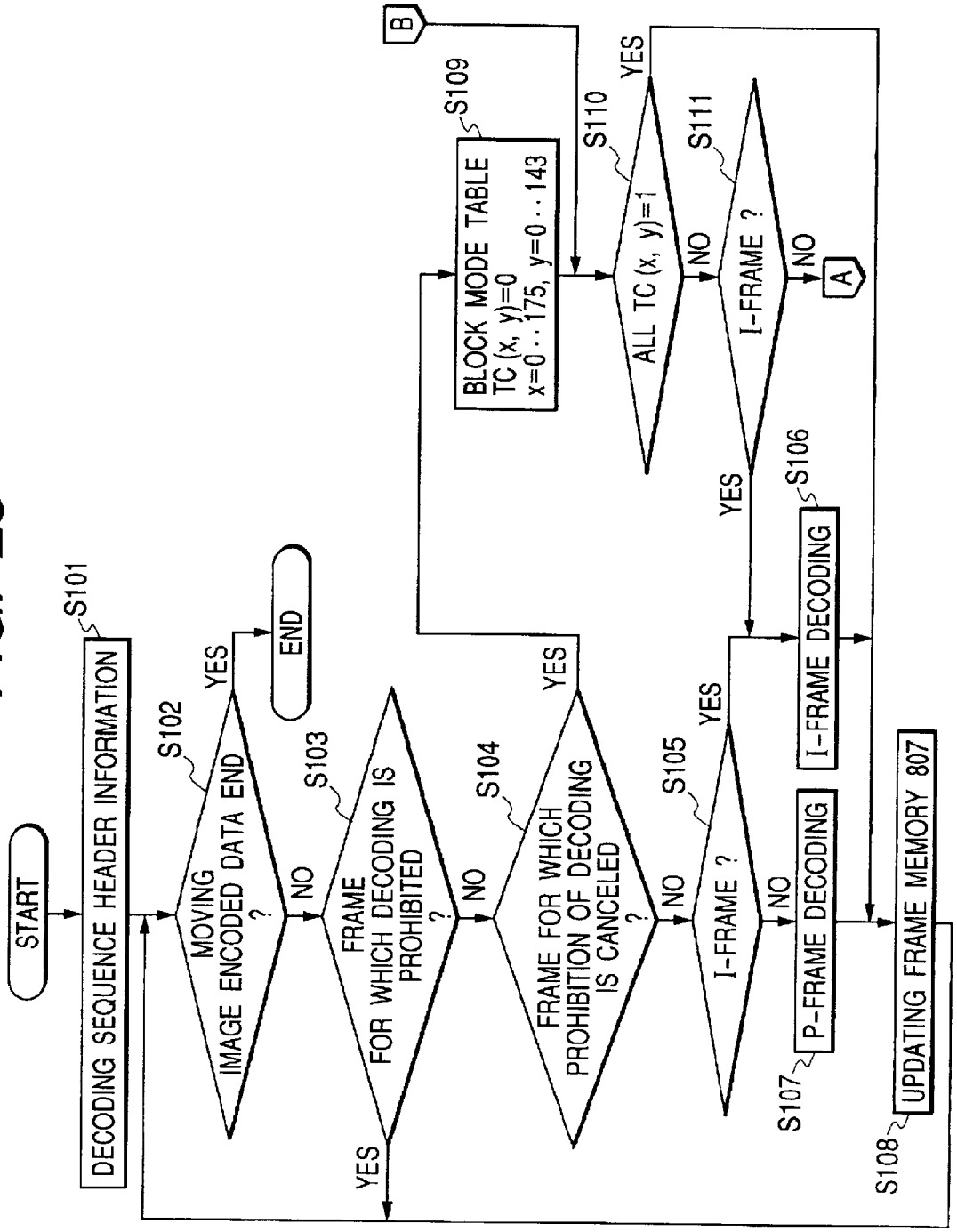
FIGS. 28, 29 and 30 are flow charts showing the function of a sixth embodiment of the present invention.

Then the sequence proceeds to the step S110 in FIG. 28 and discriminates the content of the table TC(x, y), and, if all 1, the sequence proceeds to a step S108 to write the decoded image, stored in the image area of the memory 801, into the frame memory 807, of which content is displayed on the display 808. Then the sequence proceeds to the step S102 for processing a next frame. In this manner the display of the reproduced image is re-started, and the sequence thereafter returns to the normal decoding operation.

In case the step S110 identifies that any of the pixels is not 1, there is repeated the sequence from the step S111 to S122.

The above-described selecting operations allows to ensure, after the inhibition of decoding by security (image protection (protection of intellectual property (for example copyright))) or the cancellation of inhibition, that all the pixels are free from reference to a pixel prior to the inhibition of decoding, thereby enabling reproduction from an error-free frame.

Also the motion compensation enables detailed confirmation of the pixels which are free from reference to the pixel prior to the inhibition of decoding, thereby reducing the time required for displaying the reproduced image.

Also the memory configuration or the like in the present embodiment is not restrictive.

Also in the present embodiment, the state of the image data referred to in the decoding operation is monitored in the unit of a pixel, but such unit is not restrictive and it is also possible to execute monitoring for each block composed of pixels of a small area.

Also the image size etc. are not limited to that in the present embodiment. For example the image size can be matched with the size of the image used in the steps S109, S113 for value processing.

Also the present embodiment has been explained in a case of reading the encoded data from the memory device 803, but there may be naturally adopted a configuration of reading and decoding the encoded data from the communication channel 804 through the communication interface 805.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus, comprising:
   a) input means for inputting image data;
   b) generation means for generating security data for protecting said image data;
   c) division means for dividing said image data into blocks;
   d) encoding means for encoding said image data in the unit of said block, adaptively utilizing an intrapicture encoding mode and an interpicture encoding mode;
   e) selection means for selecting said encoding mode, said selection means selecting the encoding mode in such a manner that the image data of an arbitrary block in an image are subjected to intrapicture encoding at least once within n images according to said security data; and
   f) output means for outputting security data generated by said generation means, image data encoded by said encoding means, and encoding mode data indicating the encoding mode selected by said selection means.

2. An apparatus according to claim 1, wherein said selection means selects the encoding mode in such a manner that the image data of all the blocks in a picture are subjected to intrapicture encoding for every m pictures.

3. An apparatus according to claim 1, wherein said encoding means executes encoding based on the H.263 encoding method.

4. An apparatus according to claim 1, wherein said encoding means executes encoding based on the MPEG encoding method.

5. An apparatus according to claim 1, wherein said security data are IPMP (intellectual property management and protection) data for protecting the copyright of said image data.

6. An image processing method, comprising steps of:
   a) inputting image data;
   b) generating security data for protecting said image data;
   c) dividing said image data into blocks;
   d) encoding said image data in the unit of said block, adaptively utilizing an intrapicture encoding mode and an interpicture encoding mode;
   e) selecting said encoding mode, said selecting step selecting the encoding mode in such a manner that the image data of an arbitrary block in a picture are subjected to intrapicture encoding at least once within n pictures according to said security data; and
   f) outputting said generated security data, said encoded image data, and encoding mode data indicating the selected encoding mode.

7. A computer readable memory medium storing codes of an image processing program, the codes comprising:
   a) a code of an input step of inputting image data;
   b) a code of a generation step of generating security data for protecting said image data;
   c) a code of a division step of dividing said image data into blocks;
   d) a code of an encoding step of encoding said image data in the unit of said block, adaptively utilizing an intrapicture encoding mode and an interpicture encoding mode;
   e) a code of a selection step of selecting said encoding mode, said selection step selecting the encoding mode in such a manner that the image data of an arbitrary block in a picture are subjected to intrapicture encoding at least once within n pictures according to said security data; and
   f) a code of an output step of outputting said generated security data, said encoded image data, and encoding mode data indicating the selected encoding mode.

8. An image processing apparatus, comprising:
   a) input means for inputting image data encoded by dividing an image into plural blocks and adaptively selecting intrapicture encoding and interpicture encoding in the unit of said block and security data for protecting said image data;
   b) discrimination means for discriminating, based on said security data, whether the reproduction of said encoded image data is permitted;
   c) encoding mode judging means for judging the encoding mode of said encoded image data in the unit of said block;
   d) decoding means for decoding the image data input by said input means;
   e) memory means for storing the image data decoded by said decoding means; and
   f) control means for controlling the readout of the image data stored in said memory means according to the outputs of said discrimination means and said encoding mode judging means.

9. An apparatus according to claim 8, wherein, in case said discrimination means discriminates that the reproduction of said image data is not permitted, said input means stops the supply of the image data to said decoding means.

10. An apparatus according to claim 9, wherein, in case said discriminates means discriminates that the reproduction of said image data is shifted from a non-permitted state to a permitted state, said control means reads the image data stored in said memory means from a time where all the image data in a picture are decoded without utilizing the image data during a period in which the reproduction is not permitted.

11. An apparatus according to claim 8, further comprising: display means for displaying image data read by said control means.

12. An apparatus according to claim 8, wherein said encoded image data are based on the MPEG-1 encoding method.

13. An apparatus according to claim 8, wherein said encoded image data are based on the MPEG-2 encoding method.

14. An apparatus according to claim 8, wherein said encoded image data are based on the H.263 encoding method.

15. An apparatus according to claim 8, wherein said security data are data for protecting the copyright of said image data.

16. An apparatus according to claim 8, wherein said security data are IPMP (intellectual property management and protection) data.

17. An apparatus according to claim 8, wherein, in said encoded image data, an arbitrary block in a frame is subjected to inframimage encoding at least once in n pictures.

18. An image processing method comprising steps of
   a) inputting image data encoded by dividing an image into plural blocks and adaptively selecting intrapicture encoding and interpicture encoding in the unit of said block and security data for protecting said image data;

b) discriminating, based on said security data, whether the reproduction of said encoded image data is permitted;

c) judging the encoding mode of said encoded image data in the unit of said block;

d) decoding said input image data;

e) storing said decoded image data; and f) controlling the readout of the image data stored in said memory means according to the outputs of said discrimination step and said encoding mode judging step.

19. A computer readable memory medium storing program codes of an image processing program, the codes comprising:

a) a code of an input step of inputting image data encoded by dividing an image into plural blocks and adaptively selecting intrapicture encoding and interpicture encoding in the unit of said block and security data for protecting said image data;

b) a code of a discrimination step of discriminating, based on said security data, whether the reproduction of said encoded image data is permitted;

c) a code of an encoding mode judging step of judging the encoding mode of said encoded image data in the unit of said block;

d) a code of a decoding step of decoding said input image data;

e) a code of a memory step of storing said decoded image data; and f) a code of a control step of controlling the readout of the image data stored in said memory means according to the outputs of said discrimination step and said encoding mode judging step.

* * * * *

UNITED STATES PATENT AND TRADEMARK OFFICE
CERTIFICATE OF CORRECTION

PATENT NO. : 6,859,877 B2
DATED : February 22, 2005
INVENTOR(S) : Mitsuru Maeda

It is certified that error appears in the above-identified patent and that said Letters Patent is hereby corrected as shown below:

Column 1,
Line 53, "foregoing," should read -- foregoing. --.

Column 6,
Line 60, "(projection" should read -- (protection --.

Column 7,
Line 64, "adoopted" should read -- adopted--.

Column 8,
Line 31, "coounter" should read -- counter --.

Column 10,
Line 31, "regardoless" should read -- regardless --.

Column 19,
Line 37, "$EM_{total}$" should read -- $EM_{Total}$ --.

Column 20,
Line 61, "soound," should read -- sound, --.

Column 22,
Line 13, "A MCBPC" should read -- an MCBPC --;
Line 15, "A" should read -- An --; and
Line 46, "uint 3007" should read -- unit 3007 --.

Column 23,
Line 3, "GBSC coede" should read -- GBSC code --.

Column 24,
Line 15, "reproduct" should read -- reproduce --; and
Line 22, "storedin" should read -- stored in --.

Column 25,
Line 2, "uit 604" should read -- unit 604 --.

Column 26,
Line 13, "a" should read -- an --; and
Line 48, "respectively" should read -- respective --.

UNITED STATES PATENT AND TRADEMARK OFFICE
CERTIFICATE OF CORRECTION

PATENT NO. : 6,859,877 B2
DATED : February 22, 2005
INVENTOR(S) : Mitsuru Maeda

It is certified that error appears in the above-identified patent and that said Letters Patent is hereby corrected as shown below:

Column 27,
Line 4, "piexl" should read -- pixel --; and
Line 66, "memory 614." should read -- memory 614, --.

Column 28,
Line 44, "allows" should read -- allow --.

Column 29,
Line 11, "a" should read -- an --.

Column 30,
Line 12, "softwares" should read -- software --.

Column 31,
Line 5, "decodeds" should read -- decodes --; and
Line 35, "the stores" should read -- then stores --.

Column 32,
Line 37, "allows" should read -- allow--.

Signed and Sealed this

Thirtieth Day of August, 2005

JON W. DUDAS
*Director of the United States Patent and Trademark Office*